US008842520B2

(12) United States Patent
Kolavennu

(10) Patent No.: US 8,842,520 B2
(45) Date of Patent: Sep. 23, 2014

(54) APPARATUS AND METHOD FOR IDENTIFYING OPTIMAL NODE PLACEMENT TO FORM REDUNDANT PATHS AROUND CRITICAL NODES AND CRITICAL LINKS IN A MULTI-HOP NETWORK

(75) Inventor: Soumitri N. Kolavennu, Blaine, MN (US)

(73) Assignee: Honeywell International Inc., Morristown, NJ (US)

(*) Notice: Subject to any disclaimer, the term of this patent is extended or adjusted under 35 U.S.C. 154(b) by 389 days.

(21) Appl. No.: 13/230,499

(22) Filed: Sep. 12, 2011

(65) Prior Publication Data

US 2013/0064070 A1  Mar. 14, 2013

(51) Int. Cl.
*H04L 29/14* (2006.01)
*H04L 12/24* (2006.01)

(52) U.S. Cl.
CPC .......... *H04L 41/0836* (2013.01); *H04L 41/142* (2013.01)
USPC .......................................... 370/221; 370/351

(58) Field of Classification Search
CPC ...................................................... G06F 15/16
USPC ................................................. 370/221, 351
See application file for complete search history.

(56) References Cited

U.S. PATENT DOCUMENTS

| | | | |
|---|---|---|---|
| 7,403,988 B1 | 7/2008 | Blouin et al. | |
| 7,457,860 B2 | 11/2008 | Shang et al. | |
| 7,610,367 B2 | 10/2009 | Canright et al. | |
| 7,889,679 B2 | 2/2011 | Canright et al. | |
| 7,925,599 B2 | 4/2011 | Koren et al. | |
| 8,166,204 B2* | 4/2012 | Basu et al. | 709/249 |
| 2005/0114551 A1* | 5/2005 | Basu et al. | 709/249 |
| 2006/0039286 A1 | 2/2006 | Basu et al. | |
| 2009/0059855 A1 | 3/2009 | Nanda et al. | |
| 2010/0271936 A1 | 10/2010 | Allan et al. | |
| 2010/0322244 A1 | 12/2010 | Dasylva et al. | |
| 2011/0029675 A1 | 2/2011 | Yeow et al. | |
| 2011/0115794 A1 | 5/2011 | Grabarnik et al. | |
| 2013/0035922 A1 | 2/2013 | Martens | |

FOREIGN PATENT DOCUMENTS

WO   WO 2009/096793 A1   8/2009

OTHER PUBLICATIONS

European Search Report dated Nov. 29, 2012 in connection with European Patent Application No. 12 183 402.2, 4 pages.
Communication pursuant to Article 94(3) EPC dated Dec. 6, 2012 in connection with European Patent Application No. 12 183 402.2.

(Continued)

*Primary Examiner* — Jay P Patel

(57) ABSTRACT

A method includes obtaining information identifying one or more critical nodes and/or one or more critical links in a multi-hop network. Each critical node or critical link represents a node or link whose failure isolates at least part of the network. The method also includes generating a list identifying one or more orphaned nodes that lose connectivity to a gateway when a specified critical node or critical link fails. The list is generated using an Eigenvector of a matrix defining a topology of the network without the specified critical node or critical link. The method further includes identifying, using the list, at least one location where an additional node can be inserted into the network in order to reduce a number of critical nodes and critical links in the network. The gateway and the orphaned node(s) can be associated with different values in the Eigenvector.

21 Claims, 18 Drawing Sheets

(56) References Cited

OTHER PUBLICATIONS

Arindam K. Das, et al., "K-Node Connected Power Efficient Topologies in Wireless Networks with Sectored Antennas", Military Communications Conference, Oct. 17-20, 2005, 7 pages.
Tae-Hoon Kim, et al., "Improving the Connectivity of Heterogeneous Multi-Hop Wireless Networks", IEEE International Conference on Communications, Jun. 5-9, 2011, 6 pages.
Michael M. Zavlanos, et al., "Distributed Connectivity Control of Mobile Networks", Proceedings of the 46th IEEE Conference on Dicision and Control, Dec. 12-14, 2007, p. 3591-3596.
William Liu, et al., "Weighted Algebraic Connectivity Metric for Non-Uniform Traffic in Reliable Network Design", 2009 IEEE, 6 pages.
Anna Abbagnale, et al., "Connectivity-Driven Routing for Cognitive Radio Ad-Hoc Networks", 2010 IEEE, 9 pages.
Carlos Pomalaza-Raez, "A Distributed Routing Algorithm for Multihop Packet Radio Networks with Uni- and Bi-Directional Links", 1994 IEEE, p. 233-237.
Muhammad Imran, et al., "Partitioning Detection and Connectivity Restoration Algorithm for Wireless Sesnor Actor Networks", 2010 IEEE/IFIP International Conference on Embedded and Ubiquitous Computing, p. 200-207.
Hongqing Zeng, et al., "A novel end-to-end fault detection and localization protocol for wavelength-routed WDM networks", Proc. of SPIE, vol. 5970, 2005, 8 pages.
Er. Rakesh Kumar, et al., "Design and Development of an Intelligent Routing Protocol for Mobile Ad hoc Network: A Review Paper", IJCSNS International Journal of Computer Science and Network Security, vol. 10, No. 9, Sep. 2010, p. 111-118.
Milenko Jorgic, et al., "Localized Algorithms for Detection of Critical Nodes and Links for Connectivity in Ad Hoc Networks", 2004, p. 360-371.
V. Anitha, et al., "Secured Message Transmission in Mobile Ad Hoc Networks throught Identification and Removal of Byzantine Failures", InterJRI Computer Science and Networking, vol. 2, Issue 1, Aug. 2010, p. 14-18.
Jang Woon Baek, et al., "Adaptive Multi-Path Routing with Guaranteed Target-Delivery Ratio of Critical Events in Wireless Sensor Networks", IEICE Trans. Commun., vol. E93-B, No. 2, Feb. 2010, p. 392-395.
Soumitri N. Kolavennu, "Apparatus and Method for Detecting Critical Nodes and Critical Links in a Multi-Hop Network", U.S. Appl. No. 13/230,535, filed Sep. 12, 2011.
Soumendra Nanda, et al., "Mesh-Mon: A multi-radio mesh monitoring and management system", Computer Communications, Elsevier Science Publishers BV, Amsterdam, Netherlands, vol. 31, No. 8, May 25, 2008, pp. 1588-1601.
Christos Gkantsidis, et al., "Towards Topology Aware Networks", Infocom 2007, 26th IEEE International Conference on Computer Communications, May 1, 2007, pp. 2591-2595.
European Search Report dated Jan. 30, 2013 in connection with European Application No. 12183389.1, 3 pages.
European Examination Report dated Feb. 8, 2013 in connection with European Application No. 12183389.1, 6 pages.
Tae-Hoon Kim, at al, "Improving the Topological Resilience of Mobile and Ad Hoc Networks", IEEE, 2009 7th International Workshop on the Design of Reliable Communication Networks, Oct. 25-28, 2009, pp. 191-197.
Office Action dated Jun. 11, 2014 in connection with U.S. Appl. No. 13/230,535, 13 pages.

\* cited by examiner

APPARATUS AND METHOD FOR IDENTIFYING OPTIMAL NODE PLACEMENT TO FORM REDUNDANT PATHS AROUND CRITICAL NODES AND CRITICAL LINKS IN A MULTI-HOP NETWORK

TECHNICAL FIELD

This disclosure relates generally to network analysis. More specifically, this disclosure relates to an apparatus and method for identifying optimal node placement to form redundant paths around critical nodes and critical links in a multi-hop network.

BACKGROUND

A "multi-hop network" generally refers to a network where items are transported to destinations over multiple nodes or "hops." For example, in wired and wireless communication networks, voice or data traffic is routinely routed over multiple hops to its destination. Specific examples include communication networks used in buildings, large industrial facilities, and Advanced Metering Infrastructure (AMI) systems. As another example, mobile networks can include wireless devices that constantly change positions and communicate over ever-changing communication links. Specific examples include swarms of unmanned aerial vehicles, groups of soldiers with mobile devices, or fleets of transport vehicles. As yet is another example, a power distribution grid can route power to different customers over multiple transmission lines. As still other examples, transportation networks (such as road, rail, or air systems) can transport people or materials over different routes, and social networks may involve numerous people having different relationships.

A specific example of a multi-hop wireless network is a mesh network. In this type of network, data can be passed from a source node to a destination node directly or via one or more intermediate nodes. Consider a multi-hop sensor network where wireless sensors publish sensor readings to a gateway. Not all sensors may be in direct communication range to the gateway, so some sensors can send information to the gateway through other sensors that are closer to the gateway.

Multi-hop networks are often robust and resilient to node or link failures because the networks are often able to re-route or re-connect a path from a source node to a destination node when an intermediate node or link fails. For this reason, these types of networks are often called "self-healing" networks. Although the ability to self-heal is well developed, self-healing may not always be possible. The topology of a multi-hop network plays an important role in being able to send information from any given source node to any given destination node in the face of link and node failures.

The self-healing nature of multi-hop networks often gives designers and implementers a false hope that a network is robust to node and link failures, while the topology of the network may actually make it impossible for self-healing to occur. The inability of a multi-hop network to self-heal can cause various problems, ranging from inconvenient to life-threatening. For instance, the failure of a power distribution node could cause an inconvenient power loss to homeowners or businesses. The failure of a wireless node in a military network could prevent communications with a group of soldiers on a battlefield.

In conventional systems, a brute-force approach is often taken to identify when a network may be unable to self-heal. In this approach, the removal of a node from a network is simulated, and a determination is made whether routes exist from each potential source node to each potential destination node. If not, the loss of the removed node can divide the network and prevent self-healing. However, this approach is very time consuming and computationally intensive. Also, this approach is particularly problematic if the topology of a network is constantly changing.

SUMMARY

This disclosure provides an apparatus and method for identifying optimal node placement to form redundant paths around critical nodes and critical links in a multi-hop network.

In a first embodiment, a method includes obtaining information identifying one or more critical nodes and/or one or more critical links in a multi-hop network. Each critical node or critical link represents a node or link whose failure isolates at least part of the network. The method also includes generating a list identifying one or more orphaned nodes that lose connectivity to a gateway when a specified critical node or critical link fails. The list is generated using an Eigenvector of a matrix defining a topology of the network without the specified critical node or critical link. The method further includes identifying, using the list, at least one location where an additional node can be inserted into the network in order to reduce a number of critical nodes and critical links in the network.

In a second embodiment, an apparatus includes at least one memory unit configured to store information identifying one or more critical nodes and/or one or more critical links in a multi-hop network. Each critical node or critical link represents a node or link whose failure isolates at least part of the network. The apparatus also includes at least one processing unit configured to generate a list identifying one or more orphaned nodes that lose connectivity to a gateway when a specified critical node or critical link fails. The list is generated using an Eigenvector of a matrix defining a topology of the network without the specified critical node or critical link. The at least one processing unit is also configured to identify, using the list, at least one location where an additional node can be inserted into the network in order to reduce a number of critical nodes and critical links in the network.

In a third embodiment, a computer readable medium embodies a computer program. The computer program includes computer readable program code for obtaining information identifying one or more critical nodes and/or one or more critical links in a multi-hop network. Each critical node or critical link represents a node or link whose failure isolates at least part of the network. The computer program also includes computer readable program code for generating a list identifying one or more orphaned nodes that lose connectivity to a gateway when a specified critical node or critical link fails. The list is generated using an Eigenvector of a matrix defining a topology of the network without the specified critical node or critical link. The computer program further includes computer readable program code for identifying, using the list, at least one location where an additional node can be inserted into the network in order to reduce a number of critical nodes and critical links in the network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 16, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
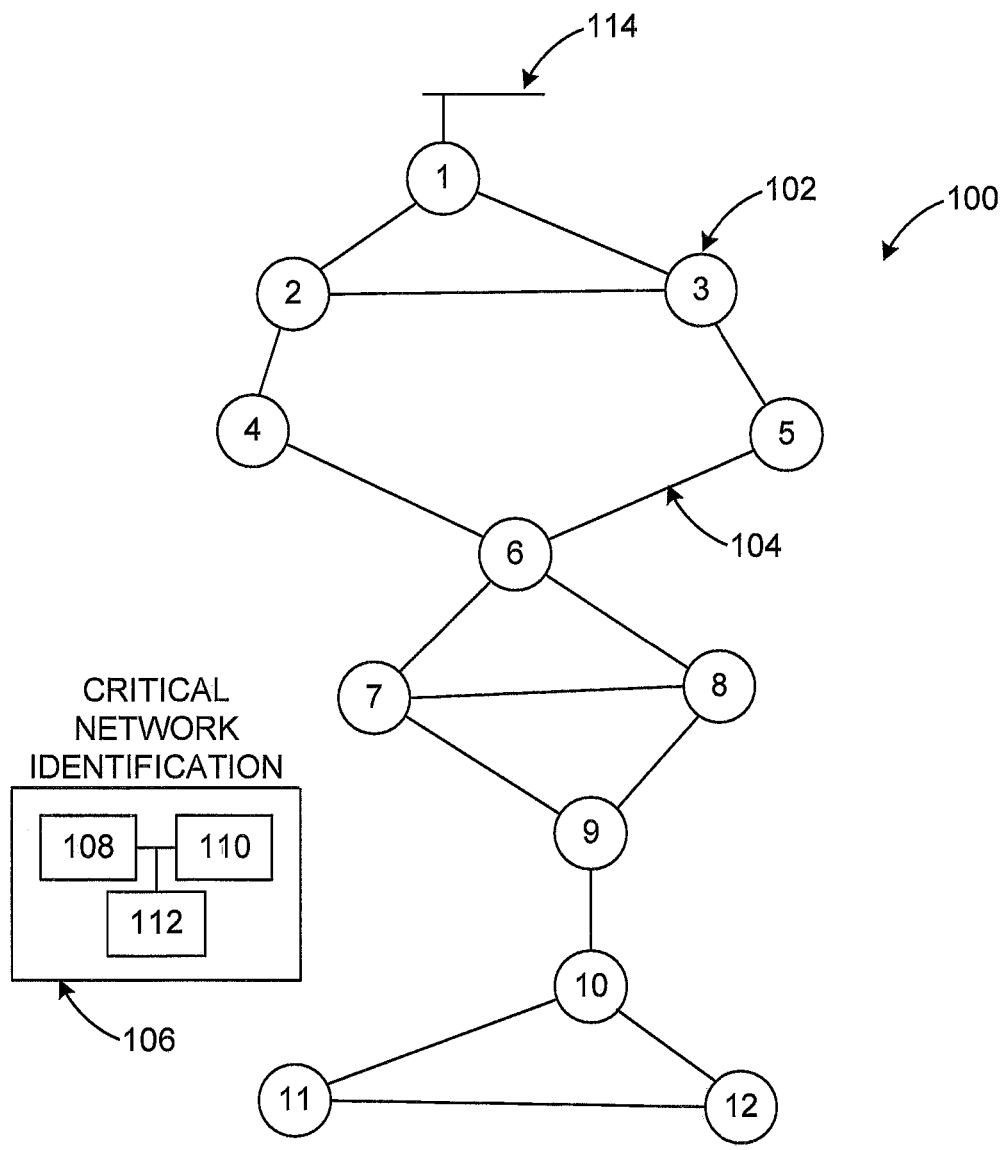
FIG. 1 illustrates an example multi-hop network according to this disclosure.

FIG. 1 illustrates an example multi-hop network 100 according to this disclosure. In FIG. 1, the network 100 is shown as generically including nodes 102 and links 104. The nodes 102 and links 104 represent various components depending on the network 100 being monitored. For example, in a wired or wireless communication system, the nodes 102 could represent communication devices, such as wired or wireless telephones, access points, routers, switches, or other devices used to transport information. Also, the links 104 could represent transmission media, such as copper or fiber optic cables or wireless links. In a power distribution system, the nodes 102 could represent distribution equipment, and the links 104 could represent electrical transmission lines. In transportation networks, the nodes 102 could represent locations or support facilities, such as airports, rail terminals, or cities. The links 104 could represent transportation lines, such as roads, rail lines, or air routes. In social networks, the nodes 102 could represent people, and the links 104 could represent relationships between those people.

These types of networks 100, nodes 102, and links 104 are non-exclusive examples of the types of multi-hop networks that can be monitored as described below. In general, any suitable multi-hop network 100 having any suitable components as nodes 102 and links 104 can be used. In the following discussion, it may be assumed that the network 100 is a wireless communication system with wireless devices (nodes 102) and wireless channels (links 104). However, any other suitable multi-hop network could be monitored. Note that the numbers and arrangements of nodes 102 and links 104 in FIG. 1 are for illustration only. A multi-hop network 100 could include any number of nodes 102 in any suitable arrangement, and those nodes 102 can be connected by any number of links 104. A specific multi-hop network could be confined to a small area or be city-wide, state-wide, country-wide, or even planet-wide in scope.

As noted above, the ability of a multi-hop network to self-heal depends on the current topology of the network. If the nodes 102 of the network 100 are arranged in a manner such that the failure of a node 102 or link 104 isolates at least one node 102 from the remaining nodes 102 in the network 100, the network 100 lacks the ability to self-heal. This is typically an undesirable situation.

In accordance with this disclosure, a critical network identification device 106 analyzes the multi-hop network 100 in order to identify critical nodes and/or critical links in the network 100. The identification device 106 also identifies locations for optimal node placement to form redundant paths around critical nodes and critical links in the network 100. A critical node represents a node 102 in a multi-hop network 100 whose loss would prevent communication between two or more remaining nodes 102 in the network 100. Similarly, a critical link represents a link 104 in a multi-hop network 100 whose loss would prevent communication between two or more nodes 102 in the network 100. In other words, a critical node or link is a node 102 or link 104 that, if lost, would split the network 100 into at least two isolated islands or unconnected sub-networks. In general, a critical link is between two critical nodes, so the number of critical links in a network is less than the number of critical nodes in the network. The critical nodes and critical links are a graph topology property of a network 100 and are typically independent of any gateway (a node 102 coupled to a wired network 114), except when a gateway itself is a critical node. Note that in some embodiments, a gateway may not be considered a critical node, even if its loss isolates the remaining nodes in the network.

In FIG. 1, the critical nodes are node #6, node #9, and node #10. If node #6 fails, the network 100 is split into two unconnected sub-networks (nodes #1-#5 and nodes #7-#12). If node #9 fails, the network 100 is split into two unconnected sub-networks (nodes #1-#8 and nodes #10-#12). If node #10 fails, the network 100 is split into two unconnected sub-networks (nodes #1-#9 and nodes #11-#12). The only critical link in FIG. 1 is the link 104 between nodes #9 and #10. The loss of this link 104 splits the network 100 into two unconnected sub-networks (nodes #1-#9 and nodes #10-#12).

In the simplified example of FIG. 1, it is relatively easy to identify the critical nodes and critical links. It is also a relatively easy task to identify where additional nodes 102 could be placed to form redundant paths around the critical nodes and critical links. However, these tasks become exceedingly difficult as more and more nodes 102 and links 104 are added to the network 100. For example, in a network 100 having five hundred nodes 102, there could be several thousand links 104. It may be difficult to manually view the network topology and identify any critical nodes and critical links or identify where additional nodes are needed. This may become virtually impossible if the nodes 102 are mobile and the network topology constantly changes. As noted above, the conventional brute-force approach is very time consuming and computationally intensive.

The critical network identification device 106 analyzes information associated with the multi-hop network 100 to identify critical nodes and critical links. The identification device 106 then uses the identification of the critical nodes and critical links to identify optimal locations where additional nodes 102 can be inserted into the network 100. For example, the identification device 106 can receive data identifying the current topology of the network 100. The network topology data could be generated or collected in any suitable manner, such as by performing an online discovery process if current topology information is not available. With the network topology data, the identification device 106 analyzes the data to identify the critical nodes and critical links. At that point, the critical nodes and critical links can be used in any suitable manner, such as to insert new nodes 102 into the network 100 so that redundant paths exist around the (previously) critical nodes and links.

Figure 2:
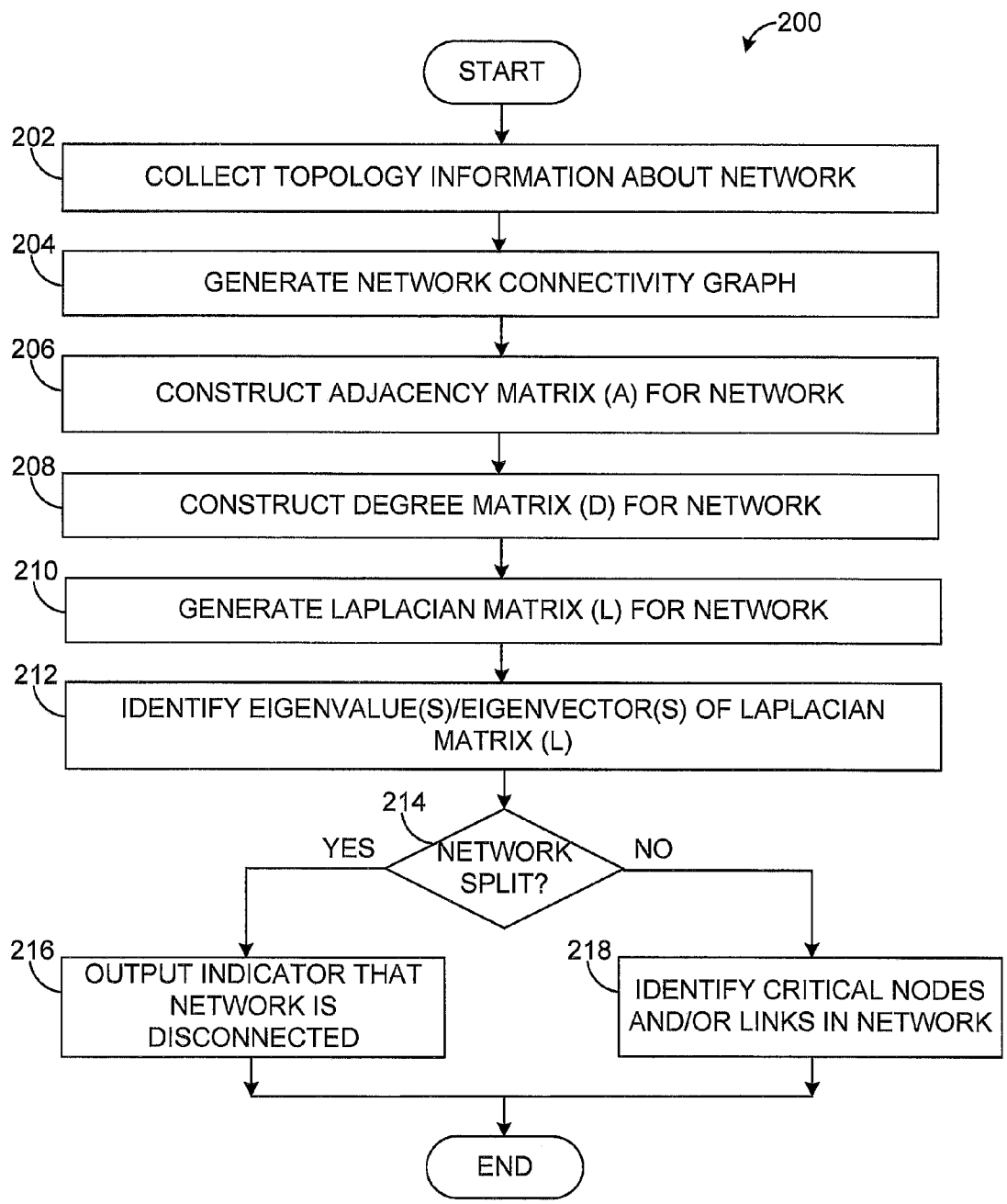
FIGS. 2 through 4 illustrate example methods for identifying critical nodes and critical links in a multi-hop network according to this disclosure.
Figure 3:
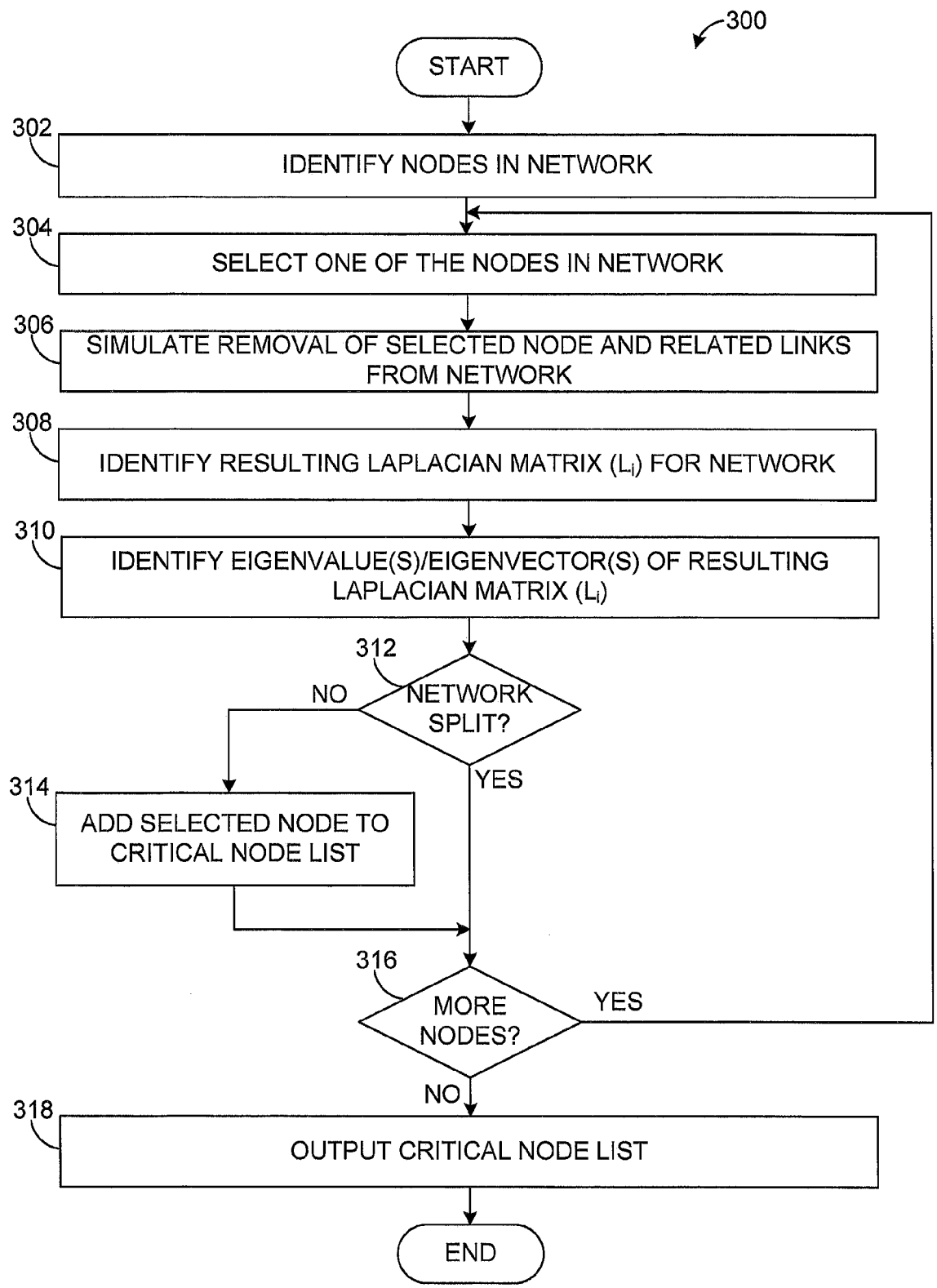
Figure 4:
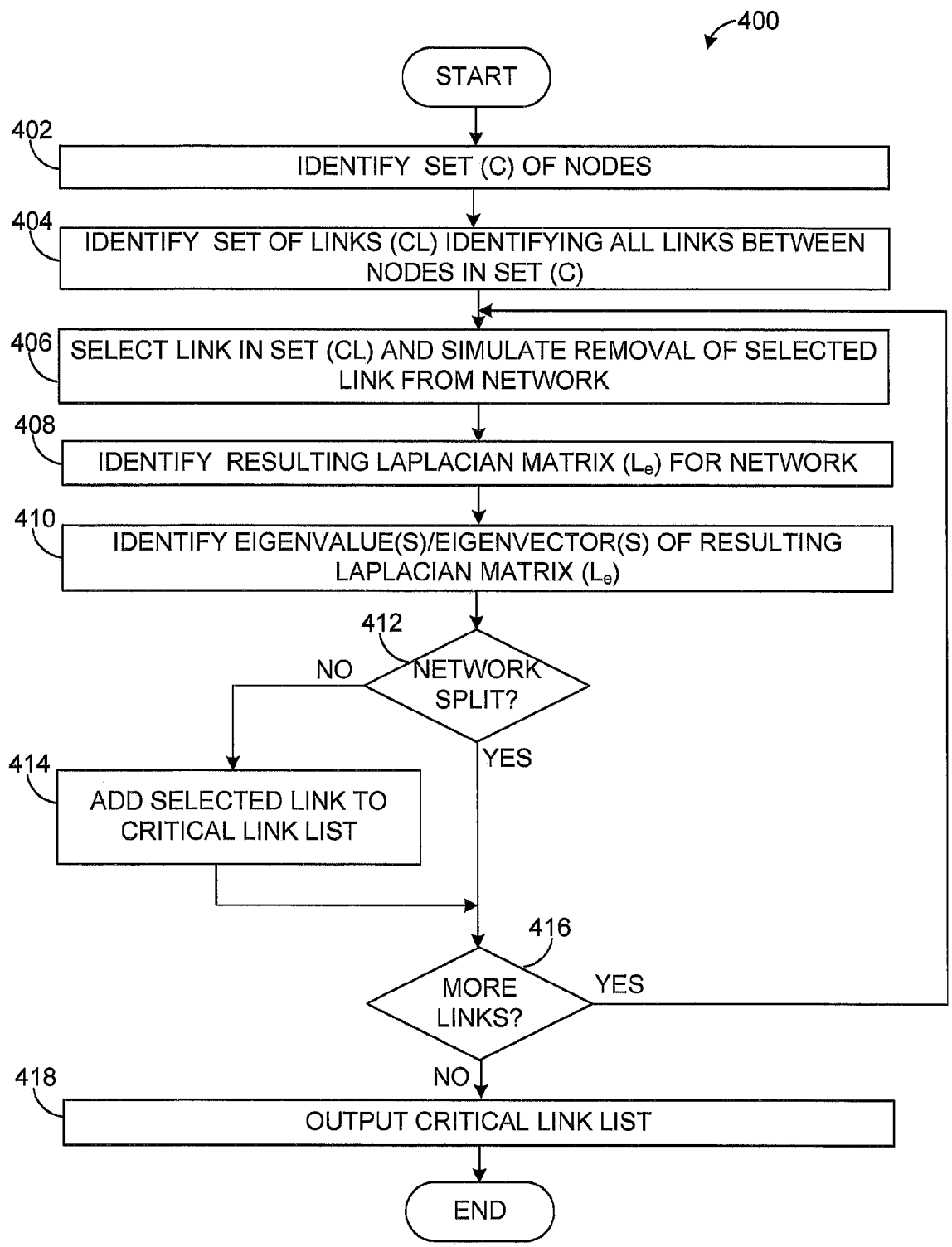

An example technique for identifying critical nodes and critical links is shown in FIGS. 2 through 4, which are described below. In this technique, the loss of one node 102 in the network 100 is simulated, and a matrix representation of the resulting network connectivity is obtained. Eigenvalues and/or Eigenvectors of the matrix are then calculated, and the Eigenvalues and/or Eigenvectors are used to determine whether the lost node 102 is a critical node. This process can be repeated for each node 102 to identify all of the critical nodes (if any) in the network 100. The critical nodes can then be used to identify any critical links (if any).

An example technique for identifying locations for optimal placement of additional nodes in a network is shown in FIGS. 7 through 13. In this technique, the identified critical nodes and critical links are used to identify "orphan lists," which are lists of nodes that lose connectivity to a gateway when a critical node or critical link is lost. These orphan lists are then used to identify where to place additional nodes 102 so that the nodes in the orphan lists can again communicate with the gateway. Ideally, the number of new nodes 102 is minimized while helping to ensure that the network 100 is able to self-heal in the event of any single node or link failure.

These techniques can be implemented using fast computational algorithms, which can be applied repeatedly with changing network topologies. This can be particularly useful for wireless communication networks or other networks that are dynamic in the face of changing environments. As particular examples, mobile networks (such as those formed by moving soldiers on a battlefield or swarms of unmanned aerial vehicles or ground vehicles) can benefit from these techniques.

Additional details regarding the operation of the critical network identification device 106 are provided below. The identification device 106 includes any suitable structure for identifying optimal node placement to form redundant paths around critical nodes and/or critical links in a multi-hop network. For example, the identification device 106 could be implemented using hardware only or a combination of hardware and software/firmware instructions. Depending on the implementation, the identification device 106 could also include any suitable structure for identifying critical nodes and/or critical links in a multi-hop network (although the identities of critical nodes and critical links could also be received from an external source or obtained in other ways).

In the example in FIG. 1, the identification device 106 is implemented using at least one processing unit 108, at least one memory unit 110, and at least one interface 112. The at least one processing unit 108 includes any suitable processing structure(s), such as a microprocessor, microcontroller, digital signal processor, application specific integrated circuit, or field programmable gate array. The at least one memory unit 110 includes any suitable volatile and/or non-volatile storage and retrieval device(s), such as a hard disk, an optical storage disc, RAM, or ROM. The at least one interface 112 includes any suitable structure(s) for providing data to one or more external destinations or receiving data from one or more external sources.

Data used by the identification device 106 could be provided to the identification device 106 in any suitable manner, such as over a network, using a portable memory device, or via user entry. Also, data generated by the identification device 106 could be provided or used in any suitable manner, such as presented on a display or transmitted via electronic messages.

The embodiment in FIG. 1 represents one specific way in which the identification device 106 can be implemented. Other implementations of the identification device 106 could be used. When implemented using software and/or firmware, the identification device 106 may include any suitable program instructions that identify optimal node placement to form redundant paths around critical nodes and/or critical links in a multi-hop network.

Although FIG. 1 illustrates one example of a multi-hop network 100, various changes may be made to FIG. 1. For example, as described above, the network 100 could represent any suitable multi-hop network having nodes 102 and links 104. Also, the identification device 106 can reside in any suitable location(s) within or outside the network 100. Further, while often described as identifying optimal node placement to form redundant paths around both critical nodes and critical links, the identification device 106 could identify optimal node placement to form redundant paths around only critical nodes or only critical links. In addition, the functional division shown in FIG. 1 is for illustration only. Various components in FIG. 1 could be combined, further subdivided, or omitted and additional components could be added according to specific needs. As a particular example, the functionality of the identification device 106 could be incorporated into one or more of the nodes 102.

FIGS. 2 through 4 illustrate example methods for identifying critical nodes and critical links in a multi-hop network according to this disclosure. For ease of explanation, the methods in FIGS. 2 through 4 are described as being performed by the identification device 106 for the multi-hop network 100 of FIG. 1. The methods could be used by any other device or system to analyze any suitable multi-hop network.

As shown in FIG. 2, a method 200 verifies that a multi-hop network is not already divided before critical nodes and/or critical links are identified. Topology information about a multi-hop network is collected at step 202. This could include, for example, the identification device 106 collecting information defining the nodes 102 and the links 104 between the nodes 102 in the network 100. The information defining the nodes 102 and links 104 in the network 100 can be obtained in any suitable manner. In some embodiments, the multi-hop network is generally static, and most or all nodes 102 and links 104 can be known ahead of time. In this case, data identifying the nodes 102 and links 104 could be retrieved from storage. However, network topology data could be obtained in other ways, such as automated analyses of network data or online collection.

In other embodiments, the multi-hop network is highly dynamic (meaning the nodes 102 and/or links 104 can constantly change), and it may not be possible to identify the nodes 102 or links 104 ahead of time. In this case, the identification device 106 can instruct the nodes 102 in the network 100 to provide information identifying their neighbors to the identification device 106. In these embodiments, each node 102 could maintain or generate a table or other data structure identifying any neighboring node (a node communicatively coupled to that node by a link). The nodes 102 could then make that information available to the identification device 106.

In particular embodiments, the network topology information could be obtained through a controlled flooding of route request messages within the network 100. This could be useful if the nodes 102 do not or cannot obtain a list of their neighboring nodes. For example, this could involve using two nodes 102 in the network 100. Once the nodes 102 join the network 100, a first node 102 sends a broadcast-based route request message to a second node 102. Route message information is flooded in the network 100, and each node 102 that receives the route request message inserts its own address and re-broadcasts the message. Normally, the second node 102 would send a route reply upon receipt of the route request message. However, for discovering network topology, the second node 102 can simply collect all received route request messages, and these messages allow the second node 102 or another component (such as the device 106) to sufficiently identify the topology of the network 100. Note that in other embodiments, the second node could represent the identification device 106 (assuming the device 106 can participate in the network 100). In that case, the first node 102 can transmit a broadcast-based route request message to the device 106, which can collect the messages to thereby collect the network topology information.

However the topology information is obtained, a network connectivity graph is generated at step 204. This could include, for example, the identification device 106 generating one or more data structures that identify each of the nodes 102 in the network 100 and each of the links 104 between the nodes 102. The data defining the nodes 102 and links 104 can be structured in any suitable format. In particular embodiments, the network connectivity graph could be defined as a collection of nodes (representing the nodes 102) and edges (representing the links 104).

An adjacency matrix (A) for the multi-hop network is generated at step 206. The adjacency matrix is a matrix representation identifying the links 104 between the nodes 102. The adjacency matrix is an n×n matrix, where n denotes the number of nodes 102 in the network 100. The adjacency matrix is constructed so that the $(i,j)^{th}$ element in the matrix has a value (such as one) if node i is connected to node j by a link 104 and another value (such as zero) otherwise. Mathematically, this can be expressed as:

$$A(i, j) = \begin{cases} 1 & \text{if } (i, j) \in E \\ 0 & \text{otherwise} \end{cases}.$$

Here, A(i,j) denotes the matrix entry for the $i^{th}$ node (in the $i^{th}$ row) and the $j^{th}$ node (in the $j^{th}$ column). Also, $(i,j) \in E$ indicates that a link 104 between the $i^{th}$ node and the $j^{th}$ node is listed as an edge in the network connectivity graph.

For the network 100 shown in FIG. 1, the adjacency matrix can be expressed as follows:

$$A = \begin{bmatrix} 0 & 1 & 1 & 0 & 0 & 0 & 0 & 0 & 0 & 0 & 0 & 0 \\ 1 & 0 & 1 & 1 & 0 & 0 & 0 & 0 & 0 & 0 & 0 & 0 \\ 1 & 1 & 0 & 0 & 1 & 0 & 0 & 0 & 0 & 0 & 0 & 0 \\ 0 & 1 & 0 & 0 & 0 & 1 & 0 & 0 & 0 & 0 & 0 & 0 \\ 0 & 0 & 1 & 0 & 0 & 1 & 0 & 0 & 0 & 0 & 0 & 0 \\ 0 & 0 & 0 & 1 & 1 & 0 & 1 & 1 & 0 & 0 & 0 & 0 \\ 0 & 0 & 0 & 0 & 0 & 1 & 0 & 1 & 1 & 0 & 0 & 0 \\ 0 & 0 & 0 & 0 & 0 & 1 & 1 & 0 & 1 & 0 & 0 & 0 \\ 0 & 0 & 0 & 0 & 0 & 0 & 1 & 1 & 0 & 1 & 0 & 0 \\ 0 & 0 & 0 & 0 & 0 & 0 & 0 & 0 & 1 & 0 & 1 & 1 \\ 0 & 0 & 0 & 0 & 0 & 0 & 0 & 0 & 0 & 1 & 0 & 1 \\ 0 & 0 & 0 & 0 & 0 & 0 & 0 & 0 & 1 & 1 & 1 & 0 \end{bmatrix}$$

The diagonal values are zero since a node 102 does not have a link 104 to itself. In this matrix, the one values in the sixth row are in the fourth, fifth, seventh, and eighth columns. This indicates that node #6 is linked directly to nodes #4, #5, #7, and #8 as shown in FIG. 1.

A degree matrix (D) for the multi-hop network is generated at step 208. The degree matrix identifies the degree of each node 102, or the number of links 104 that each node 102 has. The degree matrix is also an n×n matrix. The degree matrix is constructed so that all off-diagonal elements are zero. Each $(i,i)^{th}$ diagonal element in the degree matrix equals the number of links 104 connected to the $i^{th}$ node 102.

For the network 100 shown in FIG. 1, the degree matrix can be expressed as follows:

$$D = \begin{bmatrix} 2 & 0 & 0 & 0 & 0 & 0 & 0 & 0 & 0 & 0 & 0 & 0 \\ 0 & 3 & 0 & 0 & 0 & 0 & 0 & 0 & 0 & 0 & 0 & 0 \\ 0 & 0 & 3 & 0 & 0 & 0 & 0 & 0 & 0 & 0 & 0 & 0 \\ 0 & 0 & 0 & 2 & 0 & 0 & 0 & 0 & 0 & 0 & 0 & 0 \\ 0 & 0 & 0 & 0 & 2 & 0 & 0 & 0 & 0 & 0 & 0 & 0 \\ 0 & 0 & 0 & 0 & 0 & 4 & 0 & 0 & 0 & 0 & 0 & 0 \\ 0 & 0 & 0 & 0 & 0 & 0 & 3 & 0 & 0 & 0 & 0 & 0 \\ 0 & 0 & 0 & 0 & 0 & 0 & 0 & 3 & 0 & 0 & 0 & 0 \\ 0 & 0 & 0 & 0 & 0 & 0 & 0 & 0 & 3 & 0 & 0 & 0 \\ 0 & 0 & 0 & 0 & 0 & 0 & 0 & 0 & 0 & 3 & 0 & 0 \\ 0 & 0 & 0 & 0 & 0 & 0 & 0 & 0 & 0 & 0 & 2 & 0 \\ 0 & 0 & 0 & 0 & 0 & 0 & 0 & 0 & 0 & 0 & 0 & 2 \end{bmatrix}$$

For shorthand, this diagonal matrix can be expressed as:
D=diag[2 3 3 2 2 4 3 3 3 3 2 2].

In this matrix, the sixth column contains a value of four, indicating that the sixth node 102 has four links 104 to four neighboring nodes as shown in FIG. 1.

A Laplacian matrix (L) for the multi-hop network is generated at step 210. The Laplacian matrix is calculated by subtracting the adjacency matrix (A) from the degree matrix (D). Because of the structures of the adjacency and degree matrices, the diagonal values of the Laplacian matrix equal the diagonal values of the degree matrix. Also, the off-diagonal values of the Laplacian matrix equal negative off-diagonal values of the adjacency matrix. Mathematically, this can be expressed as:

$$L_{i,j} = \begin{cases} -1 & \text{if } (i, j) \in E \\ d_i & \text{if } i = j \\ 0 & \text{otherwise} \end{cases}$$

Here, $d_i$ denotes the degree of the $i^{th}$ node, and −1 denotes the inverted values from the adjacency matrix. Note that the Laplacian matrix could also be generated directly using the above mathematical expression.

For the network 100 shown in FIG. 1, the Laplacian matrix (L) can be expressed as follows:

$$L = \begin{bmatrix} 2 & -1 & -1 & 0 & 0 & 0 & 0 & 0 & 0 & 0 & 0 & 0 \\ -1 & 3 & -1 & -1 & 0 & 0 & 0 & 0 & 0 & 0 & 0 & 0 \\ -1 & -1 & 3 & 0 & -1 & 0 & 0 & 0 & 0 & 0 & 0 & 0 \\ 0 & -1 & 0 & 2 & 0 & -1 & 0 & 0 & 0 & 0 & 0 & 0 \\ 0 & 0 & -1 & 0 & 2 & -1 & 0 & 0 & 0 & 0 & 0 & 0 \\ 0 & 0 & 0 & -1 & -1 & 4 & -1 & -1 & 0 & 0 & 0 & 0 \\ 0 & 0 & 0 & 0 & 0 & -1 & 3 & -1 & -1 & 0 & 0 & 0 \\ 0 & 0 & 0 & 0 & 0 & -1 & -1 & 3 & -1 & 0 & 0 & 0 \\ 0 & 0 & 0 & 0 & 0 & 0 & -1 & -1 & 3 & -1 & 0 & 0 \\ 0 & 0 & 0 & 0 & 0 & 0 & 0 & 0 & -1 & 3 & -1 & -1 \\ 0 & 0 & 0 & 0 & 0 & 0 & 0 & 0 & 0 & -1 & 2 & -1 \\ 0 & 0 & 0 & 0 & 0 & 0 & 0 & 0 & 0 & -1 & -1 & 2 \end{bmatrix}$$

One or more Eigenvalues and/or one or more Eigenvectors are identified for the Laplacian matrix at step 212. For a square matrix c, if cv=λv for a scalar value λ and a non-zero vector v, the scalar value λ is an Eigenvalue, and the non-zero vector v is an Eigenvector. Any suitable technique can be used to calculate the Eigenvalues and/or Eigenvectors. In the Laplacian matrix given above for the network 100 in FIG. 1, the calculated Eigenvalues are:

0, 0.17, 0.632, . . . .

The Eigenvector for the second smallest Eigenvalue (0.174) for this Laplacian matrix is:

[0.336, 0.307, 0.307, 0.224, 0.224, 0.103, −0.028, −0.028, −0.153, −0.378, −0.458, −0.458].

A determination is made whether the network is divided or split at step 214. In some embodiments, this can be done by determining whether the second smallest Eigenvalue equals zero. If so, this indicates that the network 100 being analyzed is divided or split, meaning there are at least two islands of nodes 102 that cannot communicate with one another over the existing links 104. A non-zero second smallest Eigenvalue indicates that the network 100 being analyzed is not divided or split, meaning communications between all nodes 102 in the network 100 are possible over the existing links 104.

In other embodiments, this can be done by determining whether the Eigenvectors corresponding to the two smallest Eigenvalues have the form (for example):

[0 0 0 $k_4$ $k_5$ $k_6$ . . . ] or [$p_1$ $p_2$ $p_3$ . . . 0 0 0].

In other words, a determination is made whether the two Eigenvectors have some zero and non-zero elements, where the indices of zero elements in the first Eigenvector are the indices of the non-zero elements in the second Eigenvector and vice versa. Note that the zero and non-zero elements in the Eigenvectors need not be contiguous. If the network 100 is not split, this condition is not met.

If the network is divided, an indication that the network is currently disconnected is output at step 216. This could include, for example, presenting an indicator on a display device or otherwise providing the indicator to a user. If the network is not divided, the identification of critical nodes and/or critical links in the network occurs at step 218.

FIG. 3 illustrates an example method 300 for identifying critical nodes, which could occur during step 218 in FIG. 2. As shown in FIG. 3, the nodes in a network being analyzed are identified at step 302. This could include, for example, the identification device 106 identifying the nodes 102 in the network connectivity graph generated in FIG. 2.

One of the nodes is selected at step 304, and the removal of that node and its related links from the network is simulated at step 306. A Laplacian matrix ($L_i$) for the resulting network is identified at step 308. This could include, for example, the identification device 106 selecting a node 102 for removal based on its network identifier or any other suitable criteria. This could also include the identification device 106 generating the Laplacian matrix ($L_i$) for the network as modified (with the selected node 102 and related links 104 removed). In particular embodiments, the Laplacian matrix (L) generated during the method 200 could be updated to generate the Laplacian matrix ($L_i$). This can be done by (i) deleting the $k^{th}$ row and the $k^{th}$ column (where k represents the removed node 102) and (ii) decrementing the diagonal value for any remaining row where the deleted $k^{th}$ column previously contained a non-zero entry. The resulting Laplacian matrix is ($L_i$) is an (n−1)×(n−1) matrix. In other embodiments, the Laplacian matrix ($L_i$) could be identified directly or indirectly, such as by generating an adjacency matrix and a degree matrix for the modified network and then calculating the Laplacian matrix ($L_i$).

One or more Eigenvalues and/or one or more Eigenvectors are identified for the Laplacian matrix ($L_i$) at step 310, and a determination is made whether the modified network is divided or split at step 312. In some embodiments, this can be done by determining whether the second smallest Eigenvalue for the Laplacian matrix ($L_i$) equals zero. In other embodiments, this can be done by determining whether the Eigenvectors for the two smallest Eigenvalues of the Laplacian matrix ($L_i$) have opposite zero and non-zero entries.

If the modified network is split, the selected node that was removed is a critical node whose loss would prevent self-healing of the network. As a result, the selected node is added to a critical node list at step 314. The critical node list includes any suitable data structure identifying the critical nodes that have been identified in the network 100. Each critical node can be identified in any suitable manner, such as by network address, numerical or other identifier, or other suitable information.

A determination is made whether any additional nodes remain to be processed at step 316. In some embodiments, each node 102 in the network 100 is associated with a numerical identifier, such as numerical identifiers ranging from 1 to n. In this case, the method 300 could loop n times, where each loop involves removing the node 102 associated with the current iteration of the loop. Note that during each loop, the removal of only one node 102 may be simulated (meaning the removal of nodes is not cumulative from one loop to the next). If at least one node 102 remains to be processed, the method 300 returns to step 304, where another node is selected for removal. If not, the removal of each node has been simulated, and the critical node list is output at step 318.

Figure 5A:
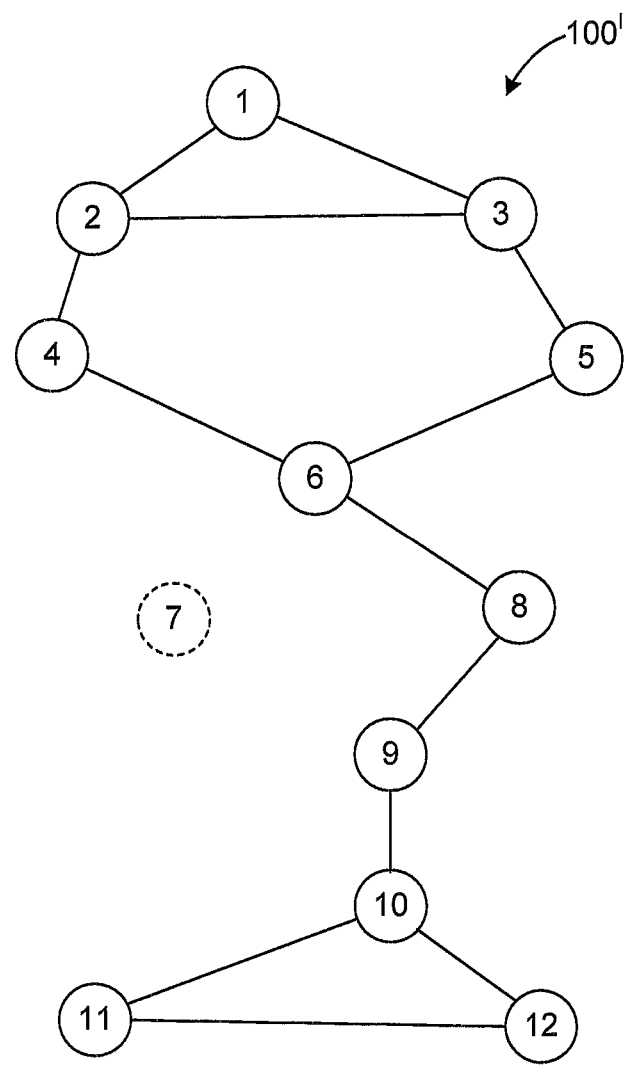
FIGS. 5A and 5B illustrate example simulated node removals in a multi-hop network according to this disclosure.
Figure 5B:
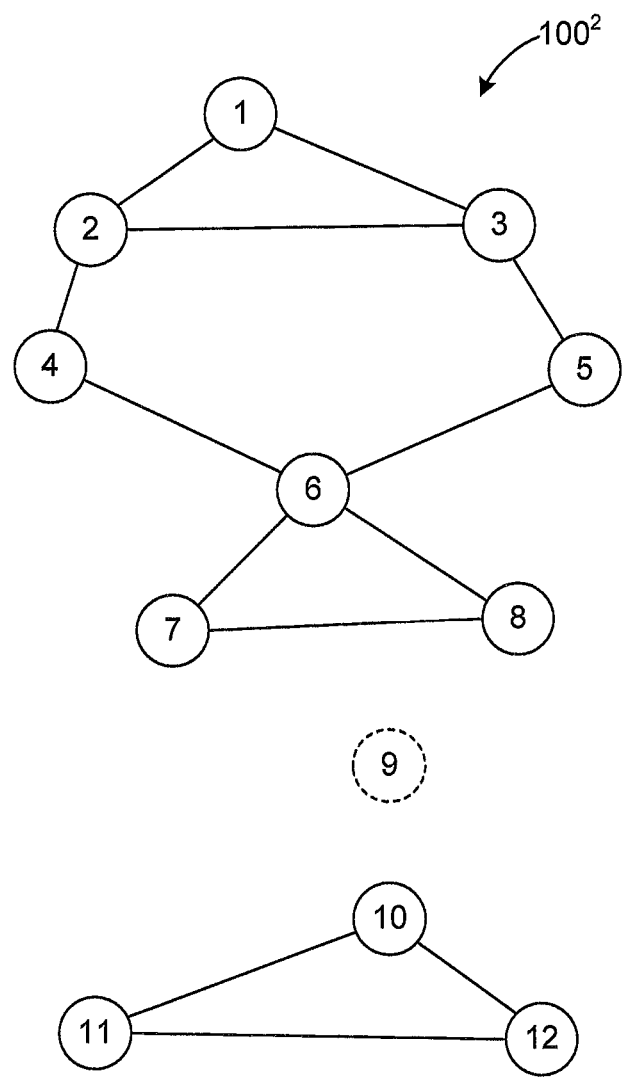

Examples of this process are shown in FIGS. 5A and 5B. FIGS. 5A and 5B illustrate example simulated node removals in the multi-hop network 100 according to this disclosure. As shown in FIG. 5A, removal of node #7 in the network has been simulated. The Laplacian matrix ($L_i$) for the resulting network $100^1$ in FIG. 5A can be expressed as follows:

$$L_i = \begin{bmatrix} 2 & -1 & -1 & 0 & 0 & 0 & 0 & 0 & 0 & 0 & 0 & 0 \\ -1 & 3 & -1 & -1 & 0 & 0 & 0 & 0 & 0 & 0 & 0 & 0 \\ -1 & -1 & 3 & 0 & -1 & 0 & 0 & 0 & 0 & 0 & 0 & 0 \\ 0 & -1 & 0 & 2 & 0 & -1 & 0 & 0 & 0 & 0 & 0 & 0 \\ 0 & 0 & -1 & 0 & 2 & -1 & 0 & 0 & 0 & 0 & 0 & 0 \\ 0 & 0 & 0 & -1 & -1 & 4 & -1 & -1 & 0 & 0 & 0 & 0 \\ 0 & 0 & 0 & 0 & 0 & -1 & 3 & -1 & -1 & 0 & 0 & 0 \\ 0 & 0 & 0 & 0 & 0 & -1 & -1 & 3 & -1 & 0 & 0 & 0 \\ 0 & 0 & 0 & 0 & 0 & 0 & -1 & -1 & 3 & -1 & 0 & 0 \\ 0 & 0 & 0 & 0 & 0 & 0 & 0 & 0 & -1 & 3 & -1 & -1 \\ 0 & 0 & 0 & 0 & 0 & 0 & 0 & 0 & 0 & -1 & 2 & -1 \\ 0 & 0 & 0 & 0 & 0 & 0 & 0 & 0 & 0 & -1 & -1 & 2 \end{bmatrix}.$$

For this Laplacian matrix ($L_i$), the calculated Eigenvalues are:

0, 0.125, 0.744, . . . .

The Eigenvector associated with the second smallest Eigenvalue (0.125) for this Laplacian matrix is:

[0.315, 0.295, 0.295, 0.238, 0.238, 0.152, −0.040, −0.227, −0.385, −0.441, −0.441].

In this case, the network $100^1$ is not split since (i) the second smallest Eigenvalue is non-zero and (ii) the Eigenvector does not have zero values as entries. As a result, node #7 is not a critical node.

As shown in FIG. 5B, removal of node #9 in the network has been simulated. The Laplacian matrix ($L_i$) for the resulting network $100^2$ in FIG. 5B can be expressed as follows:

$$L_i = \begin{bmatrix} 2 & -1 & -1 & 0 & 0 & 0 & 0 & 0 & 0 & 0 & 0 \\ -1 & 3 & -1 & -1 & 0 & 0 & 0 & 0 & 0 & 0 & 0 \\ -1 & -1 & 3 & 0 & -1 & 0 & 0 & 0 & 0 & 0 & 0 \\ 0 & -1 & 0 & 2 & 0 & -1 & 0 & 0 & 0 & 0 & 0 \\ 0 & 0 & -1 & 0 & 2 & -1 & 0 & 0 & 0 & 0 & 0 \\ 0 & 0 & 0 & -1 & -1 & 4 & -1 & -1 & 0 & 0 & 0 \\ 0 & 0 & 0 & 0 & 0 & -1 & 2 & -1 & 0 & 0 & 0 \\ 0 & 0 & 0 & 0 & 0 & -1 & -1 & 2 & 0 & 0 & 0 \\ 0 & 0 & 0 & 0 & 0 & 0 & 0 & 0 & 2 & -1 & -1 \\ 0 & 0 & 0 & 0 & 0 & 0 & 0 & 0 & -1 & 2 & -1 \\ 0 & 0 & 0 & 0 & 0 & 0 & 0 & 0 & -1 & -1 & 2 \end{bmatrix}.$$

For this Laplacian matrix ($L_i$), the calculated Eigenvalues are:
 0, 0, 0.496, . . . .
The Eigenvectors associated with the first two Eigenvalues (both zero) are:
 [0, 0, 0, 0, 0, 0, 0, 0, −0.577, −0.577, ÷0.577]
and
 [0.354, 0.354, 0.354, 0.354, 0.354, 0.354, 0.354, 0.354, 0, 0, 0].

In this case, the network $100^2$ is split since (i) the second smallest Eigenvalue is zero and (ii) the Eigenvectors are arranged such that the non-zero elements in first Eigenvector (elements #9, #10 and #11) are zero in the second Eigenvector and vice versa. In other words, the $i^{th}$ entry in one Eigenvector is zero while the $i^{th}$ entry in another Eigenvector is non-zero for all entries. As a result, node #9 is a critical node.

FIG. 4 illustrates an example method 400 for identifying critical links, which could occur during step 218 in FIG. 2. As shown in FIG. 4, a set of nodes (C) is identified at step 402. This could include, for example, adding all nodes 102 from the critical node list created in FIG. 3 to the set (C). This could also include adding all "one hop" neighbors of the critical nodes to the set (C). A "one hop" neighbor represents an immediate neighbor to a node, or a neighbor that communicates directly with the node. A set of links (CL) is generated at step 404. The set (CL) includes all links 104 between the nodes 102 in the set (C). Alternatively, steps 402-404 could simply involve identifying a set (CL) of links 104 over which any critical nodes communicate.

One of the links in the set (CL) is selected and the removal of that link is simulated at step 406. A Laplacian matrix ($L_e$) for the resulting network is identified at step 408. This could include, for example, the identification device 106 selecting a link 104 from the set (CL) for removal based on any suitable criteria. This could also include the identification device 106 generating the Laplacian matrix ($L_e$) for the network as modified (with the selected link 104 removed). In particular embodiments, the Laplacian matrix (L) generated during the method 200 could be updated to generate the Laplacian matrix ($L_e$). This can be done by (i) zeroing the matrix entries for the selected link 104 and (ii) decrementing the diagonal values for the two nodes 102 associated with the selected link 104. The resulting Laplacian matrix ($L_e$) is an n×n matrix. In other embodiments, the Laplacian matrix ($L_e$) could be identified directly or indirectly, such as by generating an adjacency matrix and a degree matrix for the modified network and then calculating the Laplacian matrix ($L_e$).

One or more Eigenvalues and/or one or more Eigenvectors are identified for the Laplacian matrix ($L_e$) at step 410, and a determination is made whether the modified network is divided or split at step 412. In some embodiments, this can be done by determining whether the second smallest Eigenvalue for the Laplacian matrix ($L_e$) equals zero. In other embodiments, this can be done by determining whether the Eigenvectors corresponding to the two smallest Eigenvalues for the Laplacian matrix ($L_e$) have opposite zero and non-zero entries.

If the modified network is split, the selected link that was removed is a critical link whose loss would prevent self-healing of the network. As a result, the selected link is added to a critical link list at step 414. The critical link list includes any suitable data structure identifying the critical links that have been identified in the network 100. Each critical link can be identified in any suitable manner, such as by network addresses of the nodes 102 coupled by the link 104, numerical or other identifier, or other suitable information.

A determination is made whether any additional links in the set (CL) remain to be processed at step 416. In some embodiments, each link 104 in the set (CL) is associated with a numerical identifier, such as numerical identifiers ranging from 1 to m. In this case, the method 400 could loop m times, where each loop involves removing the link 104 associated with the current iteration of the loop. Note that during each loop, the removal of only one link 104 may be simulated (meaning the removal of links is not cumulative from one loop to the next). If at least one link 104 remains to be processed, the method 400 returns to step 406, where another link is selected for removal. If not, the removal of each link has been simulated, and the critical link list is output at step 418.

Figure 6A:
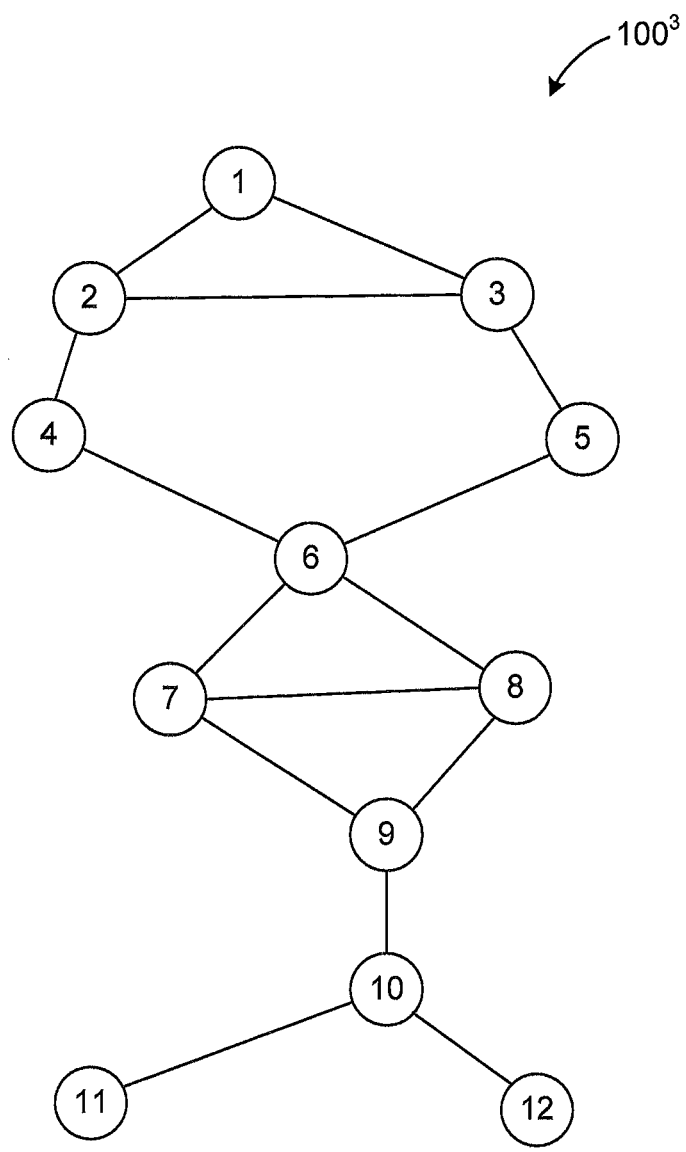
FIGS. 6A and 6B illustrate example simulated link removals in a multi-hop network according to this disclosure.
Figure 6B:
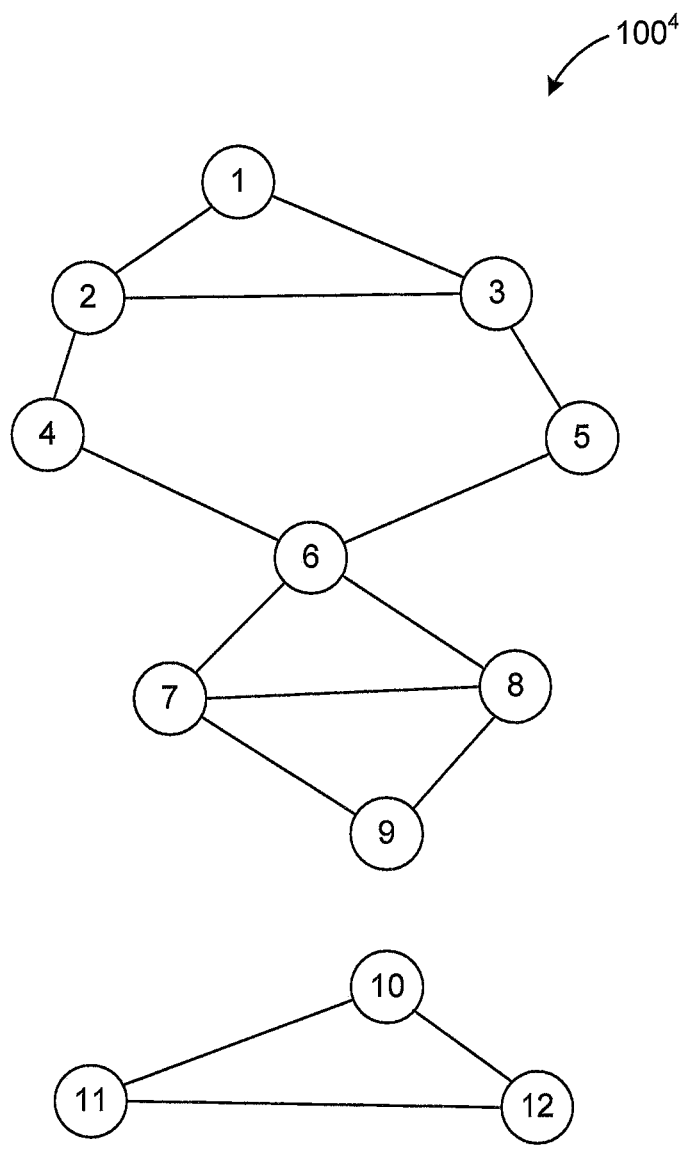

Examples of this process are shown in FIGS. 6A and 6B. FIGS. 6A and 6B illustrate example simulated link removals in the multi-hop network 100 according to this disclosure. As shown in FIG. 6A, removal of the link between node #11 and node #12 has been simulated. The Laplacian matrix ($L_e$) for the resulting network $100^3$ in FIG. 6A can be expressed as follows:

$$L_e = \begin{bmatrix} 2 & -1 & -1 & 0 & 0 & 0 & 0 & 0 & 0 & 0 & 0 & 0 \\ -1 & 3 & -1 & -1 & 0 & 0 & 0 & 0 & 0 & 0 & 0 & 0 \\ -1 & -1 & 3 & 0 & -1 & 0 & 0 & 0 & 0 & 0 & 0 & 0 \\ 0 & -1 & 0 & 2 & 0 & -1 & 0 & 0 & 0 & 0 & 0 & 0 \\ 0 & 0 & -1 & 0 & 2 & -1 & 0 & 0 & 0 & 0 & 0 & 0 \\ 0 & 0 & 0 & -1 & -1 & 4 & -1 & -1 & 0 & 0 & 0 & 0 \\ 0 & 0 & 0 & 0 & 0 & -1 & 3 & -1 & -1 & 0 & 0 & 0 \\ 0 & 0 & 0 & 0 & 0 & -1 & -1 & 3 & -1 & 0 & 0 & 0 \\ 0 & 0 & 0 & 0 & 0 & 0 & -1 & -1 & 3 & -1 & 0 & 0 \\ 0 & 0 & 0 & 0 & 0 & 0 & 0 & 0 & -1 & 3 & -1 & -1 \\ 0 & 0 & 0 & 0 & 0 & 0 & 0 & 0 & 0 & -1 & 1 & 0 \\ 0 & 0 & 0 & 0 & 0 & 0 & 0 & 0 & 0 & -1 & 0 & 1 \end{bmatrix}.$$

For this Laplacian matrix ($L_e$), the calculated Eigenvalues are:
 0, 0.174, 0.744, . . . .
The Eigenvector associated with the second smallest Eigenvalue (0.174) for this Laplacian matrix is:
 [0.336, 0.307, 0.307, 0.224, 0.224, 0.103, −0.028, −0.028, −0.153, −0.378, −0.458, −0.458].
In this case, the network $100^3$ is not split since (i) the second smallest Eigenvalue is non-zero and (ii) the Eigenvector does not have zero values as entries. As a is result, the link 104 between nodes #11 and #12 is not a critical node.

As shown in FIG. 6B, removal of the link 104 between node #9 and node #10 has been simulated. The Laplacian matrix ($L_e$) for the resulting network $100^4$ in FIG. 6B can be expressed as follows:

$$L_e = \begin{bmatrix} 2 & -1 & -1 & 0 & 0 & 0 & 0 & 0 & 0 & 0 & 0 & 0 \\ -1 & 3 & -1 & -1 & 0 & 0 & 0 & 0 & 0 & 0 & 0 & 0 \\ -1 & -1 & 3 & 0 & -1 & 0 & 0 & 0 & 0 & 0 & 0 & 0 \\ 0 & -1 & 0 & 2 & 0 & -1 & 0 & 0 & 0 & 0 & 0 & 0 \\ 0 & 0 & -1 & 0 & 2 & -1 & 0 & 0 & 0 & 0 & 0 & 0 \\ 0 & 0 & 0 & -1 & -1 & 4 & -1 & -1 & 0 & 0 & 0 & 0 \\ 0 & 0 & 0 & 0 & 0 & -1 & 3 & -1 & -1 & 0 & 0 & 0 \\ 0 & 0 & 0 & 0 & 0 & -1 & -1 & 3 & -1 & 0 & 0 & 0 \\ 0 & 0 & 0 & 0 & 0 & 0 & -1 & -1 & 2 & 0 & 0 & 0 \\ 0 & 0 & 0 & 0 & 0 & 0 & 0 & 0 & 0 & 2 & -1 & -1 \\ 0 & 0 & 0 & 0 & 0 & 0 & 0 & 0 & 0 & -1 & 2 & -1 \\ 0 & 0 & 0 & 0 & 0 & 0 & 0 & 0 & 0 & -1 & -1 & 2 \end{bmatrix}.$$

For this Laplacian matrix ($L_e$), the calculated Eigenvalues are:

0, 0, 0.390, . . . .

The Eigenvectors associated with the first two Eigenvalues (both zero) are:

[0, 0, 0, 0, 0, 0, 0, 0, 0, −0.577, −0.577, −0.577]

and

[0.333, 0.333, 0.333, 0.333, 0.333, 0.333, 0.333, 0.333, 0.333, 0, 0, 0].

In this case, the network $100^4$ is split since (i) the second smallest Eigenvalue is zero and (ii) the Eigenvectors are such that the non-zero elements in first Eigenvector (elements #10, #11 and #12) are zero in the second eigen vector and vice versa. As a result, the link 104 between nodes #9 and #10 is a critical link.

(ii) the Eigenvectors have at least three leading or trailing zeros. As a result, the link 104 between nodes #9 and #10 is not a critical node.

As can be seen here, this disclosure provides a technique for quickly identifying critical nodes and/or critical links in a multi-hop network. The technique is faster and less computationally intensive compared to standard brute-force approaches. Moreover, this technique can be easily used as a network's topology changes. Once the critical nodes and/or critical links have been identified, this information can be used in any suitable manner. For instance, this information could be used to determine how additional nodes 102 can be added to a network 100 so that at least one redundant path exists around a critical node or critical link.

Although FIGS. 2 through 4 illustrate examples of methods for identifying critical nodes and critical links in a multi-hop network, various changes may be made to FIGS. 2 through 4. For example, the method 400 could be omitted if only the identity of critical nodes is is desired, and the method 300 could be omitted if only the identity of critical links is desired. Moreover, both of the methods 300 and 400 can be omitted if it is desired to only identify whether a network is currently disconnected. Further, steps 202-216 in the method 200 could be omitted if it is known that a network is currently not divided. In addition, while shown as a series of steps, the steps in each figure could overlap, occur in parallel, or occur any number of times.

Although FIGS. 5A through 6B illustrate examples of simulated node removals and simulated link removals in a multi-hop network, various changes may be made to FIGS. 5A through 6B. For example, other node or link removals can be simulated in the multi-hop network 100.

FIGS. 7 through 13 illustrate example methods for identifying optimal node placement to form redundant paths around critical nodes and critical links in a multi-hop network according to this disclosure. For ease of explanation, the methods in FIGS. 7 through 13 are described as being performed by the identification device 106 for the multi-hop network 100 of FIG. 1. The methods could be used by any other device or system to analyze any suitable multi-hop network.

In many multi-hop networks, there is typically at least one gateway node (often in a central location), which is coupled to a wired network 114 (such as an Ethernet network or other network). The loss of a critical node or critical link in the network cuts off communications between a set of one or more nodes and the gateway. The cut-off nodes are called "orphaned nodes," and nodes still communicating with the gateway are called "connected nodes." In FIG. 1, for example, node #1 is a gateway node, and the loss of node #9 renders the nodes #10-#12 as orphaned nodes while nodes #1-#8 remain as connected nodes. The technique described below detects unconnected islands of orphaned nodes and connected nodes and attempts to bridge the islands by placing one or more additional nodes in the network. The additional node(s) can help to ensure the connectivity of the whole network even with the loss of a single critical node or a critical link.

One solution for adding additional nodes is to identify any critical nodes and place an additional node 102 right next to each critical node so that each additional node 102 maintains the same connectivity as a critical node. However, this may not be optimal since the number of additional nodes 102 always equals the number of critical nodes. Moreover, if a new node 102 is placed right next to a critical node, the new node 102 could experience the same problems experienced by the critical node (such as the same interference or power failures).

Figure 7:
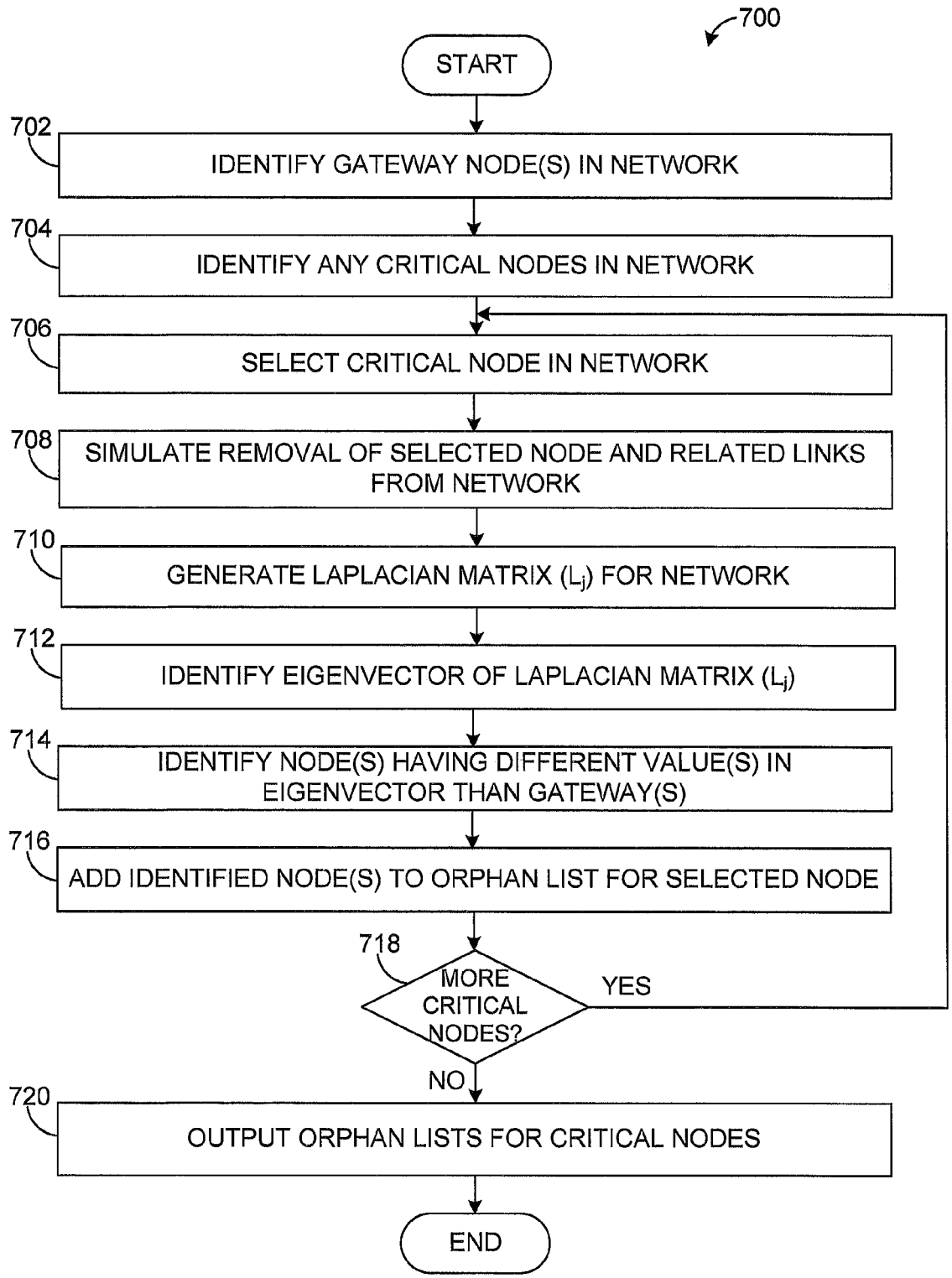
FIGS. 7 through 13 illustrate example methods for identifying optimal node placement to form redundant paths around critical nodes and critical links in a multi-hop network according to this disclosure.

As shown in FIG. 7, a method 700 identifies an orphan list for each critical node in a multi-hop network. An orphan list identifies the node(s) that lose connectivity to a gateway if an associated critical node or critical link fails. One or more gateway nodes in a multi-hop network are identified at step 702. This could include, for example, the identification device 106 receiving the identity of any gateway nodes from the nodes themselves, from a user, or in any other suitable manner.

Any critical nodes in the network are identified at step 704. This could include, for example, using the technique described above with respect to FIG. 3. Assuming at least one critical node exists, one of the critical nodes is selected at step 706, and the removal of that node and its related links from the network is simulated at step 708. A Laplacian matrix ($L_j$) for the resulting network is identified at step 710. This could include, for example, the identification device 106 selecting one of the identified critical nodes and modifying a Laplacian matrix generated during step 704. However, the Laplacian matrix ($L_j$) could be generated in any other suitable manner.

At least one Eigenvector is identified for the Laplacian matrix ($L_j$) at step 712. The Eigenvector includes n−1 values, each value associated with a remaining one of the nodes 102 in the network 100 (no value is associated with the removed critical node). Any node having a value in the Eigenvector different than the value(s) of the gateway(s) is identified at step 714. Consider the example shown in FIG. 5B. As noted above, Eigenvectors associated with the Laplacian matrix for the network $100^2$ can include:

[0, 0, 0, 0, 0, 0, 0, 0, −0.577, −0.577, −0.577]

and

[0.354, 0.354, 0.354, 0.354, 0.354, 0.354, 0.354, 0.354, 0, 0, 0].

In each Eigenvector, the gateway (node #1) has one value in that Eigenvector, and nodes #2-#8 also have the same value in that Eigenvector. This indicates that with the removal of node

9, nodes #1-#8 remain connected. However, nodes #10-#12 have a different value in each Eigenvector than the gateway. This indicates that with the removal of node #9, nodes #10-#12 become orphaned nodes. Note that while multiple Eigenvectors are shown here, only a single Eigenvector may be needed in steps 712-714. Also note that if multiple gateway nodes are present in a network, nodes could have one of multiple values and still remain connected. For instance, if nodes #1 and #12 are gateway nodes, the Eigenvectors shown above indicate that all nodes is remain connected even with the loss of node #9 (since nodes #2-#8 have matching values with node #1 and nodes #10-#11 have matching values with node #12).

Nodes identified as being orphaned nodes are added to an orphan list for the selected critical node at step 716. The orphan list could represent any suitable data structure identifying nodes 102 that lose connectivity to a gateway when the associated critical node is lost.

A determination is made whether any additional critical nodes remain to be processed at step 718. If so, the method 700 returns to step 706, and steps 706-716 are repeated for each critical node. If not, the orphan lists for the critical nodes are output at step 720.

Figure 8:
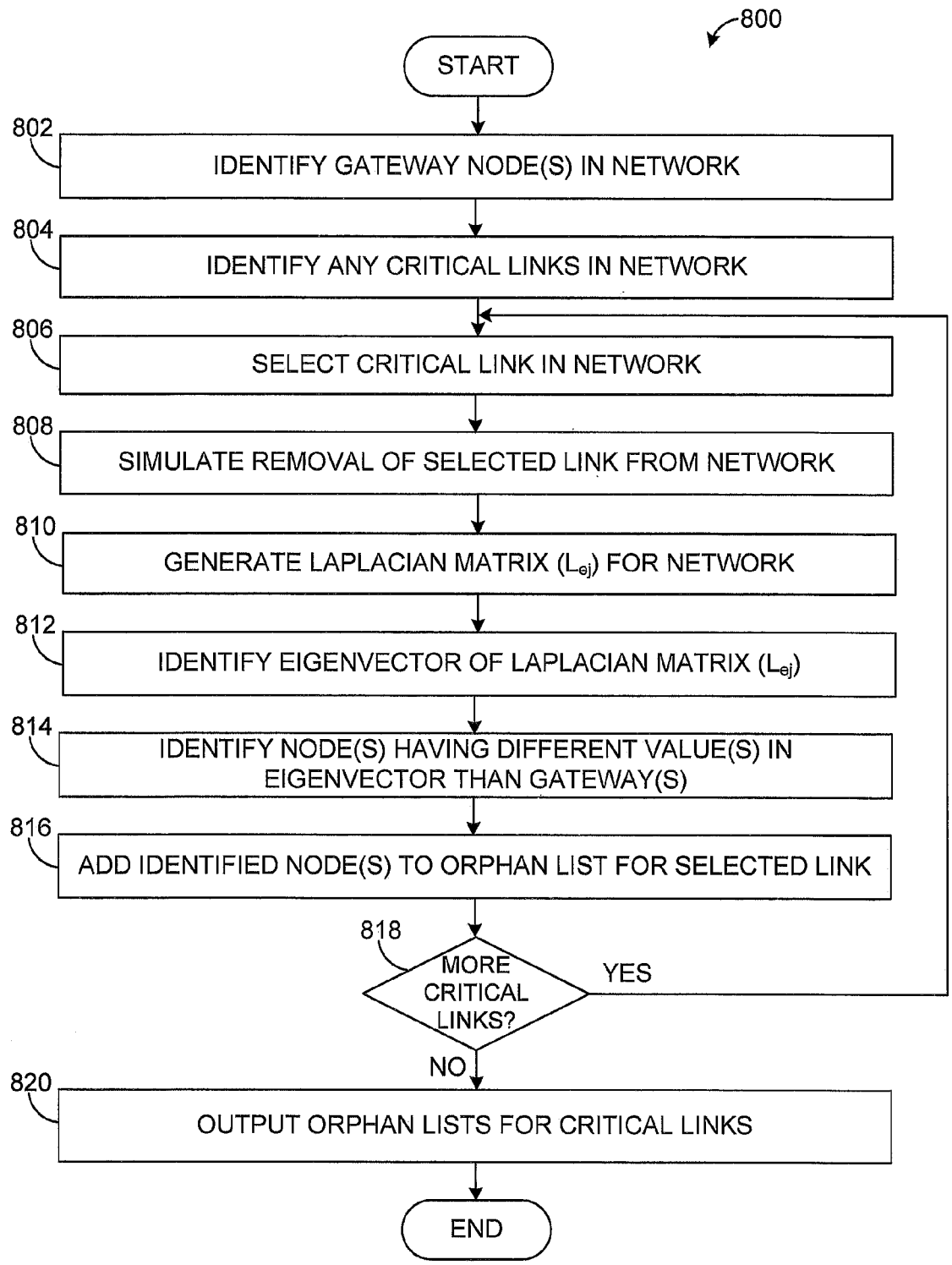

As shown in FIG. 8, a method 800 identifies an orphan list for each critical link in a multi-hop network. One or more gateway nodes in a multi-hop network are identified at step 802. Any critical links in the network are identified at step 804. This could include, for example, using the technique described above with respect to FIG. 4.

Assuming at least one critical link exists, one of the critical links is selected at step 806, and the removal of that link from the network is simulated at step 808. A Laplacian matrix ($L_{ej}$) for the resulting network is identified at step 810. This could include, for example, the identification device 106 selecting one of the identified critical links and modifying a Laplacian matrix generated during step 804. However, the Laplacian matrix ($L_{ej}$) could be generated in any other suitable manner.

At least one Eigenvector is identified for the Laplacian matrix ($L_{ej}$) at step 812. The Eigenvector includes n values, each value associated with one of the nodes 102 in the network 100. Any node having a value in the Eigenvector different than the value(s) of the gateway(s) is identified at step 814. Consider the example shown in FIG. 6B. As noted above, Eigenvectors associated with the Laplacian matrix for the network $100^4$ can include:

[0, 0, 0, 0, 0, 0, 0, 0, 0, −0.577, −0.577, −0.577]
and
[0.333, 0.333, 0.333, 0.333, 0.333, 0.333, 0.333, 0.333, 0.333, 0, 0, 0].

In each Eigenvector, the gateway (node #1) has one value in that Eigenvector, and nodes #2-#9 also have the same value in that Eigenvector. This indicates that with the removal of the link 104 between nodes #9 and #10, nodes #1-#9 remain connected. However, nodes #10-#12 have a different value in each Eigenvector than the gateway. This indicates that with the removal of the link 104 between nodes #9 and #10, nodes #10-#12 become orphaned nodes. Note that while multiple Eigenvectors are shown here, only a single Eigenvector may be needed in steps 812-814. Also note that if multiple gateway nodes are present in a network, connected nodes could have one of multiple values and still remain connected. For instance, if nodes #1 and #12 are gateway nodes, the Eigenvectors shown above indicate that all nodes remain connected even with the loss of the link 104 between nodes #9 and #10 (since nodes #2-#9 have matching values with node #1 and nodes #10-#11 have matching values with node #12).

Nodes identified as being orphaned nodes are added to an orphan list for the selected critical link at step 816. A determination is made whether any additional critical links remain to be processed at step 818. If so, the method 800 returns to step 806, and steps 806-816 are repeated for each critical link. If not, the orphan lists for the critical links are output at step 820.

Figure 9:
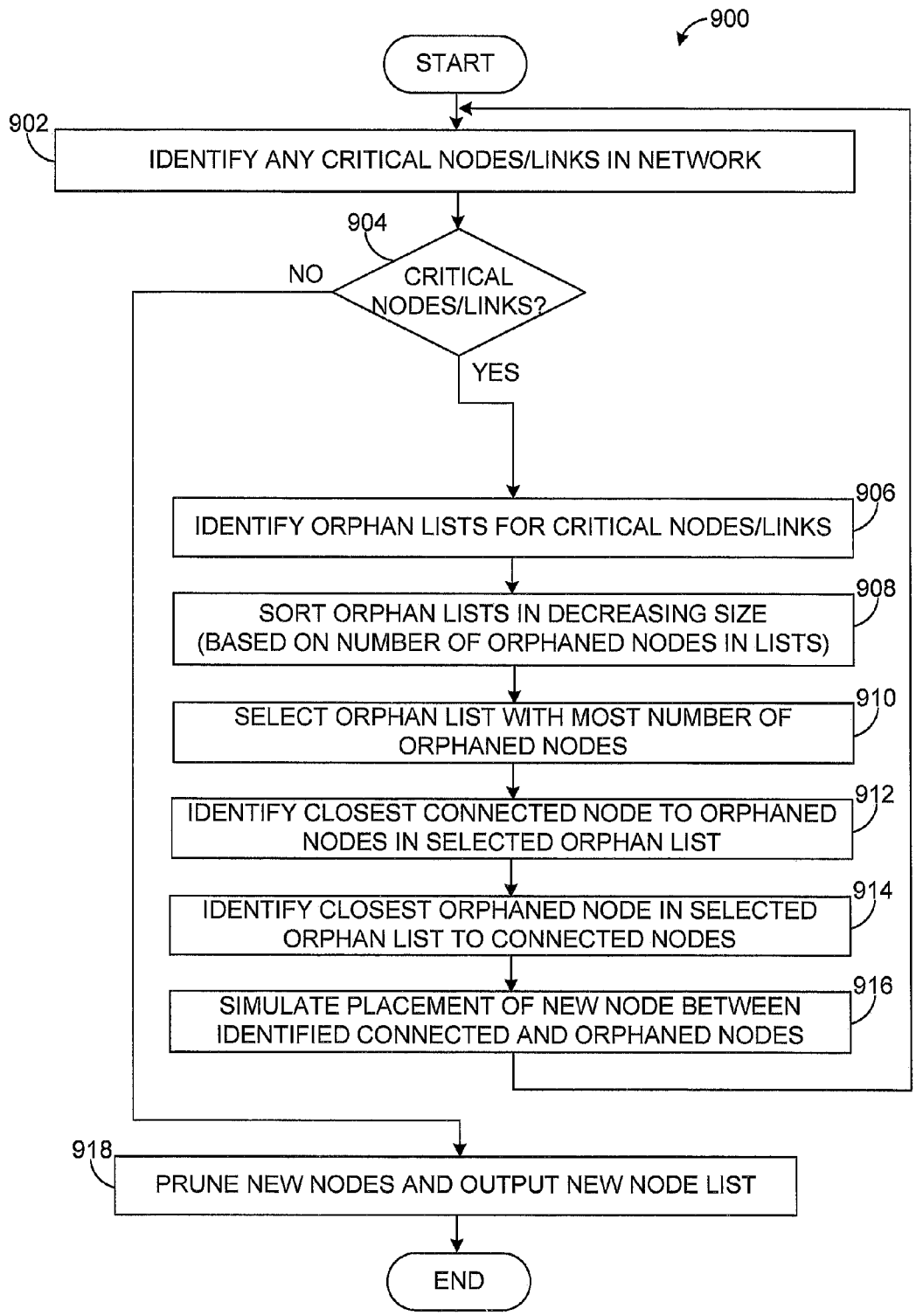

FIG. 9 illustrates an example method 900 for identifying optimal node placement to form redundant paths around critical nodes and critical links in a multi-hop network using minimum distance bridging. Any critical nodes and critical links in a multi-hop network are identified at step 902. This could include, for example, using the methods shown in FIGS. 3 and 4. A determination is made whether any critical nodes or links exist at step 904.

If at least one critical node or link exists, orphan lists for the critical nodes and links are identified at step 906. This could include, for example, using the methods shown in FIGS. 7 and 8. The orphan lists are sorted in order of decreasing size at step 908. This step sorts the orphan lists so that the orphan list with the largest number of nodes is identified and selected at step 910. Rather than sorting, steps 908-910 could be replaced by simply identifying the orphan list with the largest number of nodes. In either case, the critical node or critical link that results in the largest number of orphaned nodes being created is identified.

The closest connected node to any of the orphaned nodes in the selected orphan list is identified at step 912. Also, the closest orphaned node in the selected orphan list to any of the connected nodes is identified at step 914. In effect, steps 912-914 identify the closest possible connection point between the connected nodes and the orphaned nodes associated with the largest orphan list. Note that the identification of a closest node can be based on any suitable criteria, such as knowledge of the actual geophysical locations of the nodes.

Placement of a new node between the identified connected node and the identified orphaned node is simulated at step 916. This could include, for example, simulating the placement of a new node 102 at a midpoint directly between the closest connected and orphaned nodes.

Figure 13:
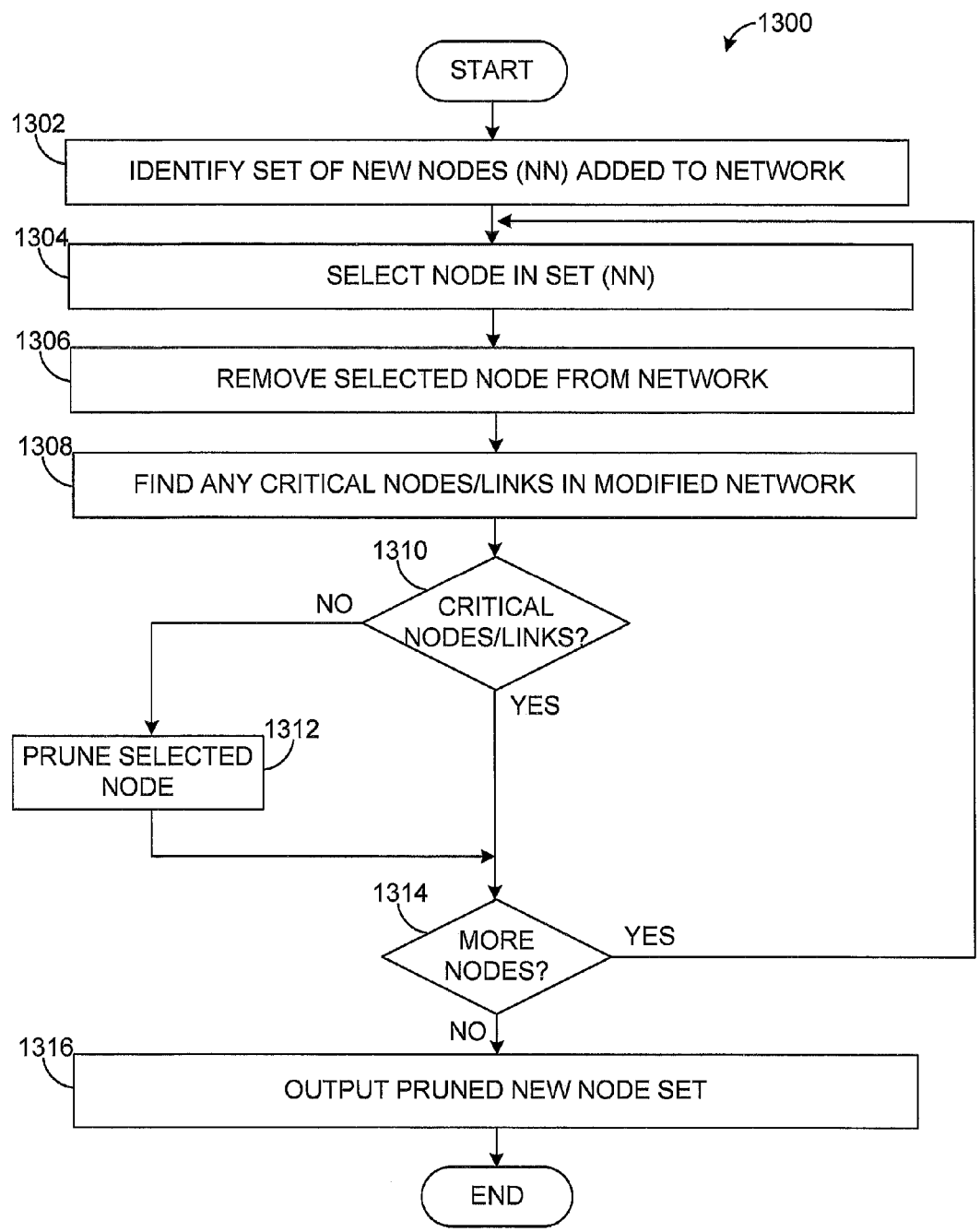

The process returns to step 902 to identify any critical nodes and links in the modified network, which now includes the new node added in step 916. The critical nodes and links are identified again for the modified network since the new node added earlier could create a redundant path around more than one critical node or link. The steps 902-916 can be repeated, adding a new node to the network each time, until no critical nodes or links are identified. At that point, the new nodes are pruned and a new node list is output at step 918. The new node list can identify the new nodes 102 to be added to the network 100 and their locations within the network 100 (such as GPS or other geographical coordinates or other location information). An example method for pruning nodes is shown in FIG. 13, which is described below.

Figure 14:
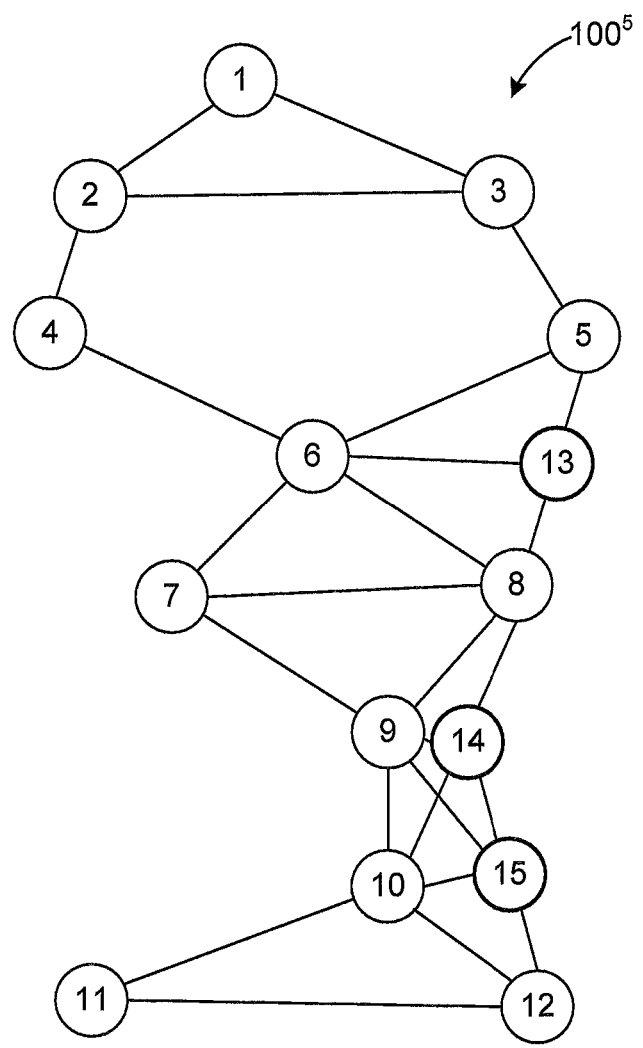
FIGS. 14 through 16 illustrate example optimal node placements to form redundant paths around critical nodes and critical links in a multi-hop network according to this disclosure.

An example of minimum distance bridging is shown in FIG. 14. In the network 100 of FIG. 1, the nodes #6, #9, and #10 are critical nodes, and the link between nodes #9 and #10 is a critical link. Following the method 900 of FIG. 9, node #6 is selected as the critical node with the largest orphan list. Node #5 is selected as the closest connected node to any orphaned node, and node #8 is selected as the closest orphaned node to any connected node. With these selections, a new node #13 is inserted at the midpoint between nodes #5 and #8.

With the insertion of node #13, nodes #9 and #10 remain as critical nodes, and the link between nodes #9 and #10 remains as a critical node. Therefore, the method 900 next selects the orphan list for node #9 since it is now the largest orphan list. Node #8 is selected as the closest connected node to any orphaned node, and node #10 is selected as the closest orphaned node to any connected node. With these selections, a new node #14 is inserted at the midpoint between nodes #8 and #10.

With the insertion of node #14, node #10 remains as a critical node. Therefore, the method 900 next selects the orphan list for node #10. Node #14 is selected as the closest connected node to any orphaned node, and node #12 is selected as the closest orphaned node to any connected node. With these selections, a new node #15 is inserted at the midpoint between nodes #14 and #12.

The nodes #13-#15 represent the new nodes 102 needed to eliminate the presence of critical nodes and critical links in the network $100^5$. As described below, no pruning is needed here since all three of the new nodes #13-#15 are needed in the network $100^5$ to remove the presence of critical nodes and critical links.

Note that minimum distance bridging could result in a higher number of new nodes being added to a network than other techniques described below. As a result, in some embodiments, minimum distance bridging could be used only if the number of critical nodes is below a threshold value.

Figure 10:
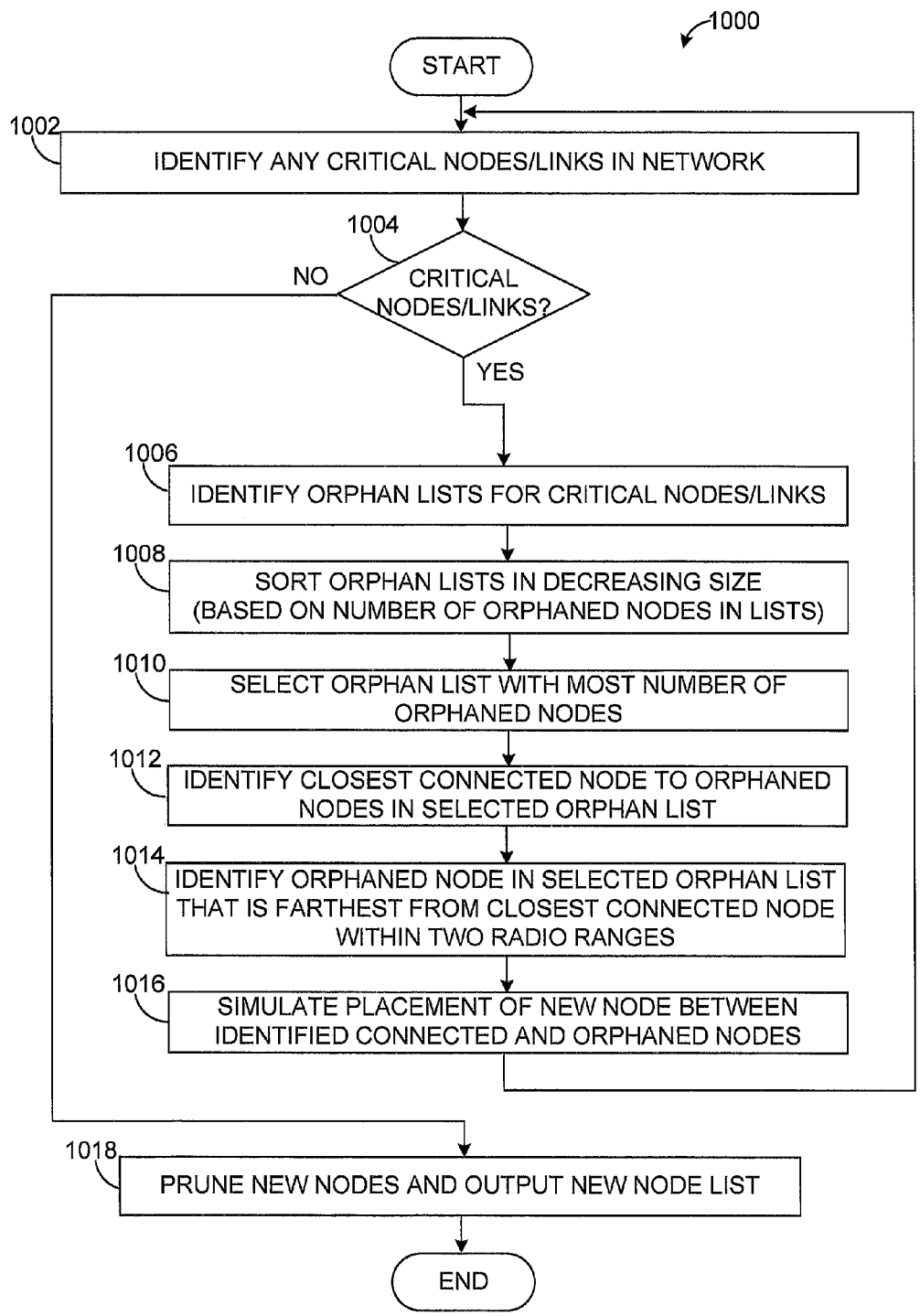

FIG. 10 illustrates an example method 1000 for identifying optimal node placement to form redundant paths around critical nodes and critical links in a multi-hop network using distance bridging with a single bridging node. Steps 1002-1010 can be the same as or similar to the steps 902-910 in FIG. 9. Steps 1002-1010 identify any critical nodes and critical links and (if at least one exists) identify the largest orphan list.

The closest connected node to any of the orphaned nodes in the selected orphan list is identified at step 1012. Also, the orphaned node in the selected orphan list that is farthest from the closest connected node within two is radio ranges is identified at step 1014. A radio range denotes the maximum distance that a radio in a node 102 can effectively transmit and/or receive. Unlike minimum distance bridging where a new node 102 is placed to link the closest connected and orphaned nodes, distance bridging with one bridging node places a new node 102 to link connected and orphaned nodes that are farther apart.

Placement of one new node between the identified connected node and the identified orphaned node is simulated at step 1016. Steps 1002-1016 can be repeated, adding a new node to the network each time, until no critical nodes or links are identified. At that point, the new nodes are pruned and a new node list is output at step 1018.

Figure 15:
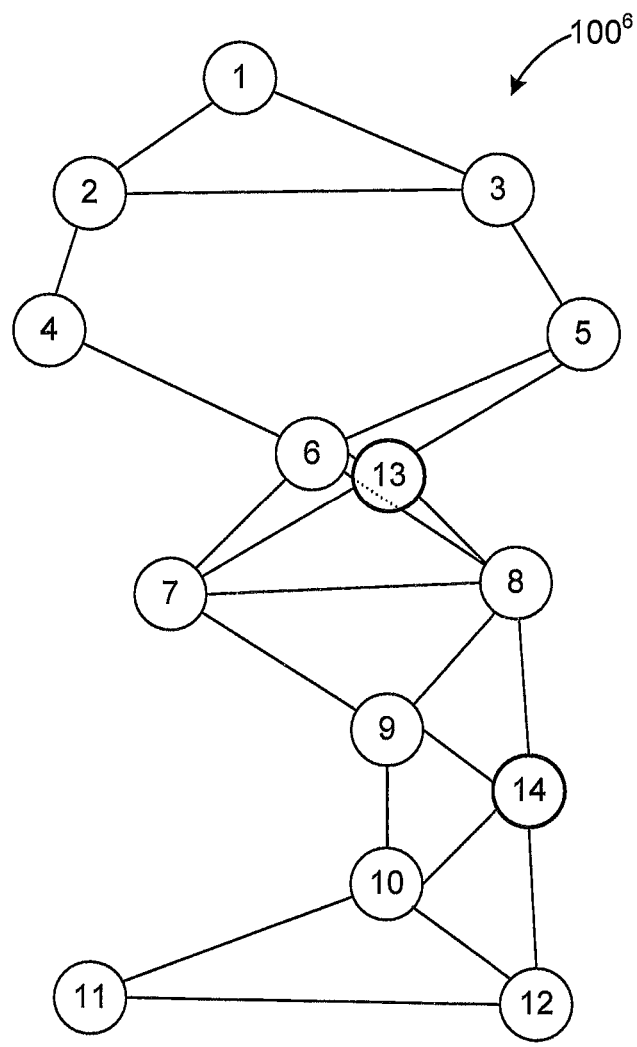

An example of distance bridging with one bridging node is shown in FIG. 15. In the network 100 of FIG. 1, the nodes #6, #9, and #10 are critical nodes, and the link between nodes #9 and #10 is a critical link. Following the method 1000 of FIG. 10, node #6 is selected as the node 102 with the largest orphan list. Node #5 is selected as the closest connected node to any orphaned node, and node #7 can be selected as the farthest orphaned node within two radio ranges of node #5. With these selections, a new node #13 is inserted at the midpoint between nodes #5 and #7.

With the insertion of node #13, nodes #9 and #10 remain as critical nodes, and the link between nodes #9 and #10 remains as a critical node. Therefore, the method 1000 next selects the orphan list for node #9 since it is now the largest orphan list. Node #8 is selected as the closest connected node to any orphaned node, and node #12 can be selected as the farthest orphaned node within two radio ranges of node #8. With these selections, a new node #14 is inserted at the midpoint between nodes #8 and #12.

With the insertion of node #14, a new link 104 can form between nodes #9 and #14, and another new link 104 can form between nodes #10 and #14. As a result, the placement of node #14 actually creates redundant paths around nodes #9 and #10 and around the link between nodes #9 and #10. Because of this, only two new nodes 102 are needed, and no pruning is needed here since both of the new nodes #13-#14 are needed in the network $100^6$ to remove the presence of critical nodes and critical links.

Figure 11:
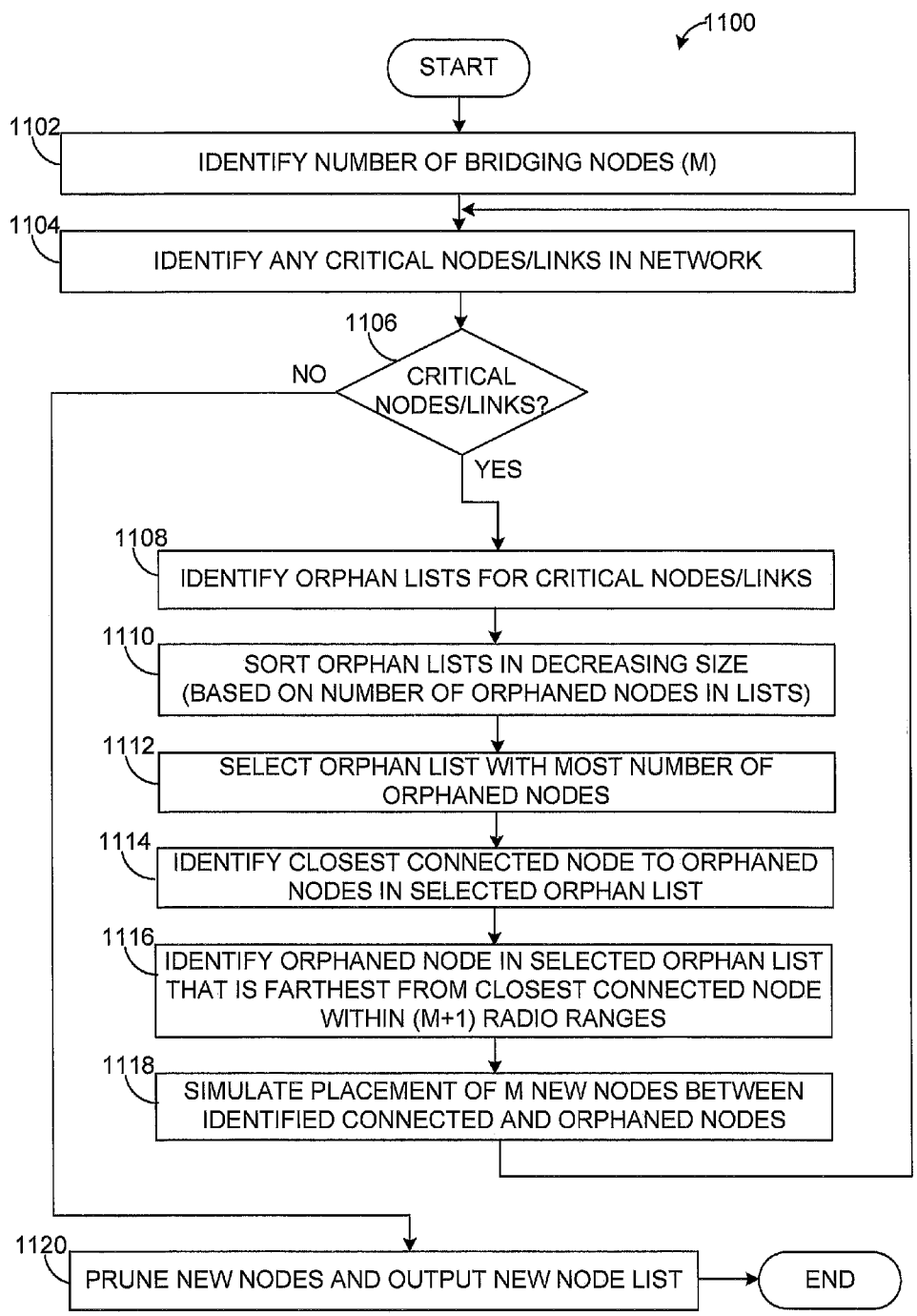

FIG. 11 illustrates an example method 1100 for identifying optimal node placement to form redundant paths around critical nodes and critical links in a multi-hop network using distance bridging with multiple bridging nodes. A number of bridging nodes (M) is selected at step 1102. The number of bridging nodes could be selected to have any suitable value, such as two or more. Steps 1104-1112 can be the same as or similar to steps 902-910 and 1002-1010. Steps 1104-1112 identify any critical nodes and critical links and (if at least one exists) identify the largest orphan list.

The closest connected node to any of the orphaned nodes in the selected orphan list is identified at step 1114. Also, the orphaned node in the selected orphan list that is farthest from the closest connected node within (M+1) radio ranges is identified at step 1116. Here, distance bridging with multiple bridging nodes places multiple new nodes to link connected and orphaned nodes that are even farther apart.

Placement of M new nodes between the identified connected node and the identified orphaned node (such as equidistant apart) is simulated at step 1118. Steps 1104-1118 can be repeated, adding M new nodes to the network each time, until no critical nodes or links are identified. At that point, the new nodes are pruned and a new node list is output at step 1120.

Figure 16:
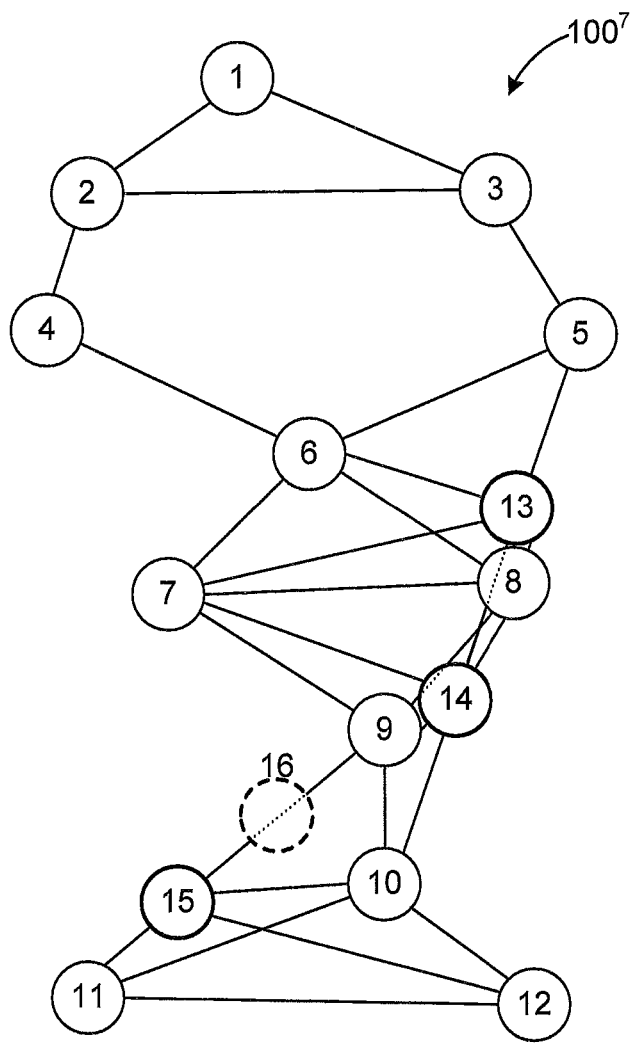

An example of distance bridging with multiple bridging nodes is shown in FIG. 16, where M equals two. In the network 100 of FIG. 1, the nodes #6, #9, and #10 are critical nodes, and the link between nodes #9 and #10 is a critical link. Following the method 1100 of FIG. 11, node #6 is selected as the node 102 with the largest orphan list. Node #5 is selected as the closest connected node to any orphaned node, and node #10 can be selected as the farthest orphaned node within three (M+1) radio ranges of node #5. With these selections, two new nodes #13 and #14 are inserted between nodes #5 and #10.

With the insertion of nodes #13 and #14, a link 104 can form between node #14 and node #10. Only node #10 then remains as a critical node, and no critical links exist. Therefore, the method 1000 selects the orphan list for node #10. Node #9 is selected as the closest connected node to any orphaned node, and node #11 can be selected as the farthest orphaned node within three (M+1) radio ranges of node #9. With these selections, new nodes #15 and #16 are inserted between nodes #9 and #11. As described below, however, node #16 is later pruned since its presence is not needed in the network $100^7$ to remove the presence of critical nodes and critical links.

Figure 12:
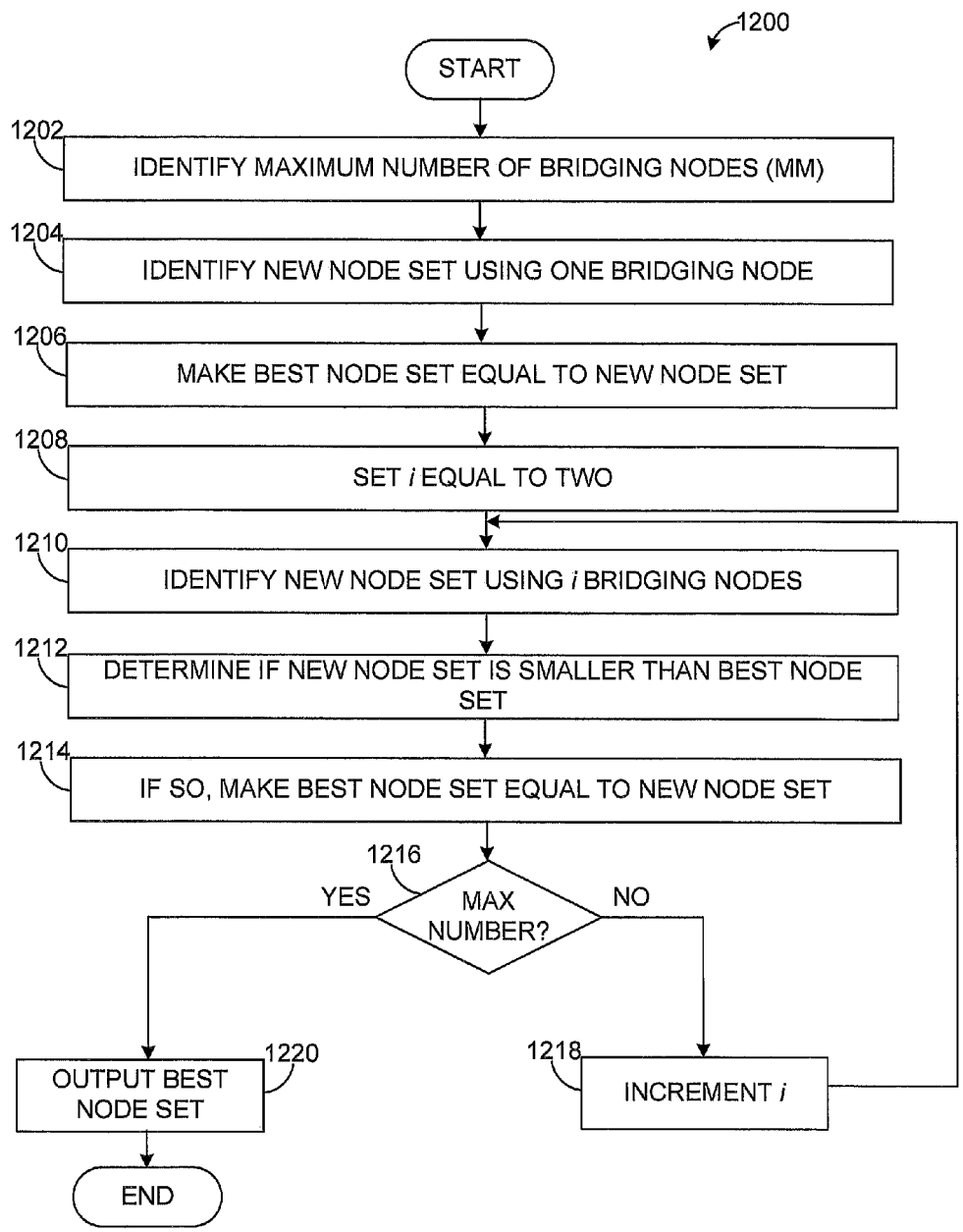

Note that in FIG. 11, it is assumed that the number of bridging nodes is fixed at a value of M. However, this need not be the case. As shown in FIG. 12, a method 1200 can be used to repeatedly execute the method 1100 with different values of M. A maximum number of bridging nodes (MM) is identified at step 1202. This value could be set in any suitable manner, such as based on user input or network administrator policies.

A new node set established using one bridging node is identified at step 1204. This could include, for example, performing the method 1000 or the method 1100 with M equal to one. A best node set is made equal to the new node set at step 1206.

A counter i is set equal to two at step 1208, and a new node set established using i bridging nodes is identified at step 1210. This could include, for example, performing the method 1100 with M equal to i. If the size of the new node set determined using i bridging nodes is smaller than the size of the current best node set at step 1212, the best node set is made equal to the current new node set at step 1214. Effectively, steps 1212-1214 are used to select the smallest number of new nodes needed to eliminate critical nodes and critical links in a network.

If the maximum number of bridging nodes has not yet been reached (i≠MM) at step 1216, the counter increments the value of i at step 1218, and the method 1200 returns to step 1210 to identify another set of new nodes with a larger number of bridging nodes. Otherwise, the best node set is output at step 1220.

In any of the methods 900-1100 described above, the identified new nodes can be added to a network to make the network more robust to failures of the original critical nodes and critical links. However, there may be more new nodes than required in order to eliminate the original critical nodes and critical links. FIG. 13 illustrates an example method 1300 for pruning new nodes being added to a multi-hop network. As shown in FIG. 13, a set of new nodes (NN) to be added to a multi-hop network is identified at step 1302. This could include, for example, receiving the set of new nodes identified by any of the methods 900-1100.

A node in the new node set is selected at step 1304. This could include, for example, selecting the node in the new node set that was first added to the new node set. The selected node is removed from the network at step 1306, and any critical nodes and links in the modified network are identified at step 1308. If no critical nodes and no critical links exist at step 1310, the selected new node is not needed in the network, and the selected new node is pruned at step 1312. This means that the selected new node can be permanently removed from the new node set. Otherwise, if any critical nodes or critical links exist at step 1310, the selected new node should be added to the network and therefore remains in the new node set.

If additional new nodes remain to be processed at step 1314, the method 1300 returns to step 1304 to select another node for removal from the network. The next selected node could be the next-oldest node added to the new node set. During each iteration of the method 1300, a different node can be removed from the network so that each new node can be examined and (if necessary) pruned from the new node set. If no new nodes in the set remain to be processed, the pruned new node set is output at step 1318.

In this way, the identification device 106 is able to identify critical nodes and critical links in a network and to identify how new nodes can be added in order to eliminate the presence of the critical nodes and critical links. This can be done quickly and, if necessary, repeatedly to help limit the creation of critical nodes and critical links and to remove existing critical nodes and critical links. This can help lead to the creation of a more robust multi-hop network.

Although FIGS. 7 through 13 illustrate examples of methods for identifying optimal node placement to form redundant paths around critical nodes and critical links in a multi-hop network, various changes may be made to FIGS. 7 through 13. For example, FIGS. 9 through 11 illustrate three different techniques for bridging connected and orphaned nodes, but other techniques could be used. Also, the largest orphan list need not be selected for use in adding new nodes to a network. In addition, while shown as a series of steps, the steps in each figure could overlap, occur in parallel, or occur any number of times.

Although FIGS. 14 through 16 illustrate examples of optimal node placements to form redundant paths around critical nodes and critical links in a multi-hop network, various changes may be made to FIGS. 14 through 16. For example, other node insertion techniques can be simulated in the multi-hop network 100.

Note that in FIGS. 9 through 11, it is assumed that new nodes 102 can be placed freely within the network 100. This assumes that there are no obstructions or other sources of interference within the area where the network 100 is located. In other embodiments, however, there may be buildings, natural obstructions, or other sources of interference within the area where the network 100 is located. In this case, the identification device 106 can use information about known obstructions or other sources of interference when placing new nodes 102 within the network 100. Also, based on the existing network topology, it may not be possible to eliminate all critical nodes or critical links in a network 100 without adding a large number of new nodes 102 to the network 100. In some embodiments, a maximum number of new nodes could be specified, in which case the identification device 106 could eliminate some (but not all) of the critical nodes and critical links in a network 100.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising the steps of:
using one or more processing devices:
obtaining information identifying at least one of: one or more critical nodes and one or more critical links in a multi-hop network, each critical node or critical link representing a node or link whose failure isolates at least part of the network;
generating a list identifying one or more orphaned nodes that lose connectivity to a gateway when a specified critical node or critical link fails, the list generated using an Eigenvector of a matrix defining a topology of the network without the specified critical node or critical link; and
identifying, using the list, at least one location where an additional node can be inserted into the network in order to reduce a number of critical nodes and critical links in the network.

2. The method of claim 1, wherein generating the list comprises:
identifying a first value associated with the gateway in the Eigenvector; and
identifying the one or more orphaned nodes as any node associated with a second value not equal to the first value in the Eigenvector.

3. The method of claim 2, wherein:
the network comprises multiple gateways;
identifying the first value comprises identifying multiple first values associated with the multiple gateways in the Eigenvector; and
identifying the one or more orphaned nodes comprises identifying the one or more orphaned nodes as any node associated with a second value not equal to any of the first values in the Eigenvector.

4. The method of claim 1, wherein:
the matrix comprises a Laplacian matrix having rows and columns, each row associated with a different node in the network, each column associated with a different node in the network;
an $(i,j)^{th}$ entry in the matrix indicates whether a link exists between the $i^{th}$ node and the $j^{th}$ node; and
an $(i,i)^{th}$ it entry in the matrix identifies a degree of the $i^{th}$ node.

5. The method of claim 1, wherein:
generating the list comprises generating multiple lists of orphaned nodes, each list associated with a different critical node or critical link; and
identifying the at least one location comprises identifying the at least one location using the orphaned list identifying a largest number of orphaned nodes.

6. The method of claim 1, wherein identifying the at least one location comprises:
identifying a closest connected node to any orphaned node in the list, the connected node comprising a node that retains connectivity to the gateway when the specified critical node or critical link fails;
identifying a closest orphaned node to the identified connected node; and
identifying a location between the identified connected node and the identified orphaned node.

7. The method of claim 1, wherein identifying the at least one location comprises:
identifying a closest connected node to any orphaned node in the list, the connected node comprising a node that retains connectivity to the gateway when the specified critical node or critical link fails;

identifying a farthest orphaned node from the identified connected node that is within a specified number of radio ranges of the identified connected node; and
identifying at least one location between the identified connected node and the identified orphaned node.

8. The method of claim 7, wherein identifying the at least one location further comprises:
changing the specified number of radio ranges to identify multiple sets of locations; and
selecting the set of locations having a smallest number of locations.

9. The method of claim 1, wherein identifying the at least one location comprises:
identifying multiple locations where multiple additional nodes can be inserted into the network; and
pruning at least one of the multiple additional nodes when the at least one additional node can be removed without increasing the number of critical nodes and critical links in the network.

10. The method of claim 1, further comprising:
repeating the obtaining, generating, and identifying steps until no critical nodes and no critical links are in the network.

11. An apparatus comprising:
at least one memory device configured to store information identifying at least one of: one or more critical nodes and one or more critical links in a multi-hop network, each critical node or critical link representing a node or link whose failure isolates at least part of the network; and
at least one processing device configured to:
generate a list identifying one or more orphaned nodes that lose connectivity to a gateway when a specified critical node or critical link fails, the list generated using an Eigenvector of a matrix defining a topology of the network without the specified critical node or critical link; and
identify, using the list, at least one location where an additional node can be inserted into the network in order to reduce a number of critical nodes and critical links in the network.

12. The apparatus of claim 11, wherein the at least one processing device is configured to generate the list by:
identifying a first value associated with the gateway in the Eigenvector; and
identifying the one or more orphaned nodes as any node associated with a second value not equal to the first value in the Eigenvector.

13. The apparatus of claim 11, wherein:
the matrix comprises a Laplacian matrix having rows and columns, each row associated with a different node in the network, each column associated with a different node in the network;
an $(i,j)^{th}$ entry in the matrix indicates whether a link exists between the $i^{th}$ node and the $j^{th}$ node; and
an $(i,i)^{th}$ entry in the matrix identifies a degree of the $i^{th}$ node.

14. The apparatus of claim 11, wherein the at least one processing device is configured to identify the at least one location by:
identifying a closest connected node to any orphaned node in the list, the connected node comprising a node that retains connectivity to the gateway when the specified critical node or critical link fails;
identifying a closest orphaned node to the identified connected node; and
identifying a location between the identified connected node and the identified orphaned node.

15. The apparatus of claim 11, wherein the at least one processing device is configured to identify the at least one location by:
- identifying a closest connected node to any orphaned node in the list, the connected node comprising a node that retains connectivity to the gateway when the specified critical node or critical link fails;
- identifying a farthest orphaned node from the identified connected node that is within a specified number of radio ranges of the identified connected node; and
- identifying at least one location between the identified connected anode and the identified orphaned node.

16. The apparatus of claim 15, wherein the at least one processing device is configured to identify the at least one location further by:
- changing the specified number of radio ranges to identify multiple sets of locations; and
- selecting the set of locations having a smallest number of locations.

17. The apparatus of claim 11, wherein the at least one processing device is configured to identify the at least one location by:
- identifying multiple locations where multiple additional nodes can be inserted into the network; and
- pruning at least one of the multiple additional nodes when the at least one additional node can be removed without increasing the number of critical nodes and critical links in the network.

18. A non-transitory computer readable medium embodying a computer program, the computer program comprising computer readable program code for:
- obtaining information identifying at least one of: one or more critical nodes and one or more critical links in a multi-hop network, each critical node or critical link representing a node or link whose failure isolates at least part of the network;
- generating a list identifying one or more orphaned nodes that lose connectivity to a gateway when a specified critical node or critical link fails, the list generated using an Eigenvector of a matrix defining a topology of the network without the specified critical node or critical link; and
- identifying, using the list, at least one location where an additional node can be inserted into the network in order to reduce a number of critical nodes and critical links in the network.

19. The computer readable medium of claim 18, wherein the computer readable program code for identifying the at least one location comprises computer readable program code for:
- identifying a closest connected node to any orphaned node in the list, the connected node comprising a node that retains connectivity to the gateway when the specified critical node or critical link fails;
- identifying a closest orphaned node to the identified connected node; and
- identifying a location between the identified connected node and the identified orphaned node.

20. The computer readable medium of claim 18, wherein the computer readable program code for identifying the at least one location comprises computer readable program code for:
- identifying a closest connected node to any orphaned node in the list, the connected node comprising a node that retains connectivity to the gateway when the specified critical node or critical link fails;
- identifying a farthest orphaned node from the identified connected node that is within a specified number of radio ranges of the identified connected node; and
- identifying at least one location between the identified connected node and the identified orphaned node.

21. The computer readable medium of claim 18, wherein the computer readable program code for identifying the at least one location comprises computer readable program code for:
- identifying multiple locations where multiple additional nodes can be inserted into the network; and
- pruning at least one of the multiple additional nodes when the at least one additional node can be removed without increasing the number of critical nodes and critical links in the network.

\* \* \* \* \*